(12) United States Patent
Saito et al.

(10) Patent No.: US 7,354,633 B2
(45) Date of Patent: Apr. 8, 2008

(54) RETARDATION FILM, AND POLARIZING PLATE AND DISPLAY DEVICE USING THE SAME

(75) Inventors: Koichi Saito, Kawagoe (JP); Kunio Shimizu, Otsuki (JP); Isamu Michihata, Machida (JP)

(73) Assignee: Konica Minolta Opto, Inc., Tokyo (JP)

( * ) Notice: Subject to any disclaimer, the term of this patent is extended or adjusted under 35 U.S.C. 154(b) by 0 days.

(21) Appl. No.: 11/281,844

(22) Filed: Nov. 18, 2005

(65) Prior Publication Data

US 2006/0115608 A1 Jun. 1, 2006

(30) Foreign Application Priority Data

Nov. 30, 2004 (JP) ............................. 2004-345732

(51) Int. Cl.
*C08B 3/00* (2006.01)
*C08L 1/10* (2006.01)

(52) U.S. Cl. ............. 428/1.3; 106/169.23; 106/169.25; 106/169.39; 349/96; 349/118; 264/208; 264/211

(58) Field of Classification Search ................ 428/1.1, 428/1.3, 1.33, 1.54; 560/154, 180, 190; 106/169.23, 106/169.25, 169.39; 349/96, 117–118; 264/207–208, 264/211
See application file for complete search history.

(56) References Cited

U.S. PATENT DOCUMENTS

| | | | |
|---|---|---|---|
| 5,324,853 A | * | 6/1994 | Jones et al. .................... 560/98 |
| 2001/0026338 A1 | * | 10/2001 | Aminaka ...................... 349/117 |
| 2003/0020208 A1 | * | 1/2003 | Tsaka et al. .................. 264/217 |
| 2003/0170482 A1 | * | 9/2003 | Murakami ................... 428/615 |

FOREIGN PATENT DOCUMENTS

| | | |
|---|---|---|
| JP | 9-90101 | 4/1997 |
| JP | 11-92574 | 4/1999 |
| JP | 2002-14230 | 1/2002 |
| JP | 2002-62430 | 2/2002 |
| JP | 2002-71955 | 3/2002 |
| JP | 2004-279931 | 10/2004 |

* cited by examiner

*Primary Examiner*—Rena Dye
*Assistant Examiner*—Sow-Fun Hon
(74) *Attorney, Agent, or Firm*—Finnegan, Henderson, Farabow, Garrett & Dunner, L.L.P.

(57) ABSTRACT

A retardation film containing a polyalcohol ester, a polycarboxylic acid ester, and a cellulose ester, wherein a total acylation degree of the cellulose ester is in the range of 2.4-2.8; and a Mw/Mn value of the cellulose ester is in the range of 1.4-3.0, provided that Mw represents a weight average molecular weight and Mn represent a number average molecular weight of the cellulose ester.

11 Claims, 1 Drawing Sheet

RETARDATION FILM, AND POLARIZING PLATE AND DISPLAY DEVICE USING THE SAME

This application is based on Japanese Patent Application No. 2004-345732 filed on Nov. 30, 2004 in Japanese Patent Office, the entire content of which is hereby incorporated by reference.

FIELD OF THE INVENTION

The present invention relates to an optical phase retardation film, a polarizing plate using the retardation film and a display using the polarizing plate, and specifically relates to an optical phase retardation film of which environmental variation of the retardation value is reduced, dimensional stability under severe conditions is improved, and haze is suppressed, as well as to a polarizing plate using the retardation film and a display using the polarizing plate.

BACKGROUND OF THE INVENTION

A large sized liquid crystal display (LCD) have recently attracted attention. With respect to large-sized LCDs, required therein is higher performance, for example, in viewing angle, contrast and stability in quality against environmental changes, compared to the required performance for conventional personal notebook computers or LCD monitors. Therefore, higher performance is also required for the polarizing plates used for the large sized LCD device or for the cellulose ester film used for the polarizing plate. Specifically, with respect to a stretched cellulose ester film, the performance of which has a large effect on the optical property of an optical phase retardation film (hereinafter, merely referred to as a retardation film), more severe specifications are required as one of the important members of a LCD device. A cellulose film is provided with an optical phase retardation property by stretching the film. Using this method, it is not fully easy to obtain a stable retardation value by stretching when a cellulose triacetate film is used, which has been widely used for such film. In order to obtain a stable retardation value in a cellulose triacetate film, proposed have been methods to use additives, to select substituents or to control the acetylation degree of a cellulose triacetate film. However, the method to provide the desired retardation effect by stretching tends to fracture the film, and markedly lowers the productivity of the retardation film. Further, since retardation films of a higher stretching ratio have been produced to obtain the desired retardation value, a resulting problem has been a tendency to cause haze.

In order to improve the display performance of an LCD, a backlight unit has more commonly been provided behind the liquid crystal cell to directly illuminate the liquid crystal cell without usin a light guide. However, in this direct illumination backlight system, when a LED backlight unit is used instead of a fluorescence tube backlight unit, deterioration of display quality due to leakage of light in the peripheral areas of the display, also known as "corner spots" tends to occur in accordance with the temperature increase caused by heat generated from the LED backlight unit, and further improvement to overcome the drawback has been desired.

For example, in Patent Document 1, an optical film employing cellulose acetate propionate is proposed. The aim of this optical film is to attain low optical anisotropy and high heat resistance, but not to effectively utilize the optical anisotropy. Plasticizers, for example, a phosphate ester, a fatty acid ester, a phthalate ester and a citrate ester, disclosed in this patent document are compounds which reduce the optical anisotropy rather than increase the optical anisotropy.

In Patent Document 2, a cellulose ester film containing a citrate ester plasticizer is disclosed. However, this film also aims to obtain a cellulose ester film exhibiting small optical anisotropy. It has been thought to be difficult to use a citrate ester plasticizer for the purpose of effectively utilizing the optical anisotropy.

In Patent Document 3, a method to prepare a retardation film is disclosed. When a cellulose ester film is stretched to provide a retardation effect to the cellulose ester film, both in-plane retardation value and out-of-plane (in the thickness direction) retardation value change by stretching, and the control of these retardation values are not fully easy. Specifically, when a citrate ester is mixed with the cellulose ester, since it has an effect to reduce anisotropy of the film, it is not fully easy to keep the Rt/Ro value at not less than 1. Also, improvement in an environmental variation of a retardation value and light leakage is desirable.

In order to obtain a display exhibiting long term stability of display quality and high productivity, disclosed is a retardation film of which moisture permeability is reduced (for, example, refer to Patent Document 4). Also, in order to obtain a display exhibiting limited light leakage caused by thermal distortion and high display quality, disclosed is a retardation film of which expansion coefficient due to moisture absorption is suppressed below a prescribed value (for example, refer to Patent Document 5). A polarizing plate exhibiting high durability even under a high humidity-high temperature condition is also disclosed, which is attained by controlling the diffusion coefficient of boric acid in the polarizing plate (for example, refer to Patent Document 6). In this patent document, disclosed is a method to control the diffusion coefficient of boric acid by decreasing free volume in a cellulose acylate film, and in paragraph [0015] of this patent document, it is described that the free volume in a cellulose acylate film can be decreased by increasing the amount of crystals in the film. However, with respect to this polarizing plate, improvement in retardation value stability and dimensional stability under severe conditions have further been desired. Specifically, in an amorphous-like cellulose ester, for example, a mixed acid ester of cellulose such as cellulose acetate propionate, a notable effect has not been fully obtained.

(Patent Document 1) Japanese Patent Publication Open to Public Inspection (hereafter referred to as JP-A) No. 9-90101
(Patent Document 2) JP-A No. 11-92574
(Patent Document 3) JP-A No. 2002-62430
(Patent Document 4) JP-A No. 2002-14230
(Patent Document 5) JP-A No. 2002-71955
(Patent Document 6.) JP-A No. 2004-279931

SUMMARY OF THE INVENTION

An object of the present invention is to provide a retardation film exhibiting reduced environmental variation of retardation values and improved dimensional stability, and to provide a display having a direct illumination backlight unit exhibiting reduced light leakage by using a polarizing plate employing the retardation film.

One of the aspects of the present invention to achieve the above object is a retardation film containing a polyalcohol ester, a polycarboxylic acid ester, and a cellulose ester, wherein a total acylation degree of the cellulose ester is in the range of 2.4-2.8; and a Mw/Mn value of the cellulose ester is in the range of 1.4-3.0, provided that Mw represents a weight average molecular weight and Mn represent a number average molecular weight of the cellulose ester.

DESCRIPTION OF THE PREFERRED EMBODIMENTS

Figure 1:
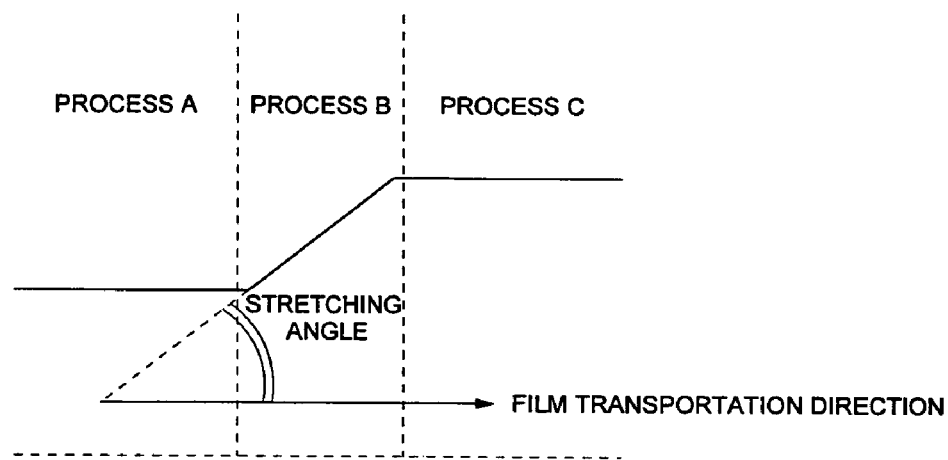
FIG. 1 is a diagram explaining the stretching angle in a stretching process.

The above object of the present invention is achieved by the following structures.
(1) A retardation film containing a polyalcohol ester, a polycarboxylic acid ester, and a cellulose ester, wherein a total acylation degree of the cellulose ester is in the range of 2.4-2.8; and
a Mw/Mn value of the cellulose ester is in the range of 1.4-3.0, provided that Mw represents a weight average molecular weight and Mn represent a number average molecular weight of the cellulose ester.
(2) The retardation film of Item (1), wherein
the polyalcohol ester is a ester of a monocarboxylic acid and a polyalcohol;
the monocarboxylic acid contains an aromatic ring or a cycloalkyl ring in the molecule; and
a hydroxyl value of the polyalcohol ester is not more than 10 mgKOH/g.
(3) The retardation film of Item (1) or Item (2), wherein
the polycarboxylic acid ester is an polyoxycarboxylic acid ester; and
an acid value of the polycarboxylic acid ester is not more than 1 mgKOH/g.
(4) The retardation film of any one of Items (1) to (3), wherein
a free volume radius determined by positron annihilation lifetime spectroscopy is in the range of 0.250-0.310 nm.
(5) The retardation film of any one of Items (1) to (4), wherein
a free volume parameter determined by positron annihilation lifetime spectroscopy is in the range of 1.0-2.0.
(6) The retardation film of any one of Items (1) to (5), wherein
Ro and Rt defined by the following formulas satisfy the following conditions:
Ro is in the range of 30-300 nm;
Rt is in the range of 100-400 nm; and
Rt/Ro is in the range of 1.5-6.0,
wherein $Ro=(nx-ny)\times d$ $Rt=(((nx+ny)/2)-nz)\times d$ wherein Ro represents an in-plane retardation value; Rt represents an out-of-plane retardation value in a thickness direction; nx represents an in-plane refractive index in a slow axis direction; ny represents an in-plane refractive index in a fast axis direction; nz represents an out-of-plane refractive index in the thickness direction; and d represents a thickness (nm) of the retardation film.

(7) The retardation film of any one of Items (1) to (6), wherein
Ro and Rt satisfy the following conditions:
Ro is in the range of 50-300 nm;
Rt is in the range of 130-400 nm; and
Rt/Ro is in the range of 1.5-6.0.
(8) The retardation film of Item (6) or Item (7), wherein the thickness of the retardation film is in the range of 40,000-70,000 nm.
(9) A polarizing plate containing the retardation film of any one of Items (1) to (8) and a polarizing film.
(10) A display comprising the retardation film of any one of Items (1) to (8) provided on one surface of a liquid crystal cell and a direct illumination backlight.

The present invention enables to provide a retardation film exhibiting reduced environmental variation of retardation values and improved dimensional stabilization even under severe conditions and to provide a display having a direct illumination backlight unit provided behind the liquid crystal cell exhibiting reduced light leakage by using a polarizing plate employing the retardation film.

The preferred embodiments of the present invention will now be explained, however, the present invention is not limited thereto.

The retardation film of the present invention is characterized by containing a polyalcohol ester, a carboxylic acid ester and a cellulose ester having a total acylation degree of the cellulose ester in the range of 2.4-2.8 and a Mw/Mn value of the cellulose ester in the range of 1.4-3.0, provided that Mw represents a weight average molecular weight and Mn represent a number average molecular weight of the cellulose ester.

Details for every component of the present invention will now be explained.

<Polyalcohol Esters>

A polyalcohol ester contained in the retardation film of the present invention is an ester of a polyalcohol having a valence of two or more and a monocarboxylic acid, the polyalcohol preferably having a valence of 3-20.

Polyalcohols of polyalcohol esters utilized in the retardation film of the present invention are generally expressed in the following Formula (1):

$R_1$—$(OH)_n$ Formula (1)

where $R_1$ represents an organic group having a valence of n, n represents a positive integer of two or more, and —OH represents an alcoholic or a phenolic hydroxy group. Examples of preferable polyalcohol include: adonitol, arabitol, ethylene glycol, diethylene glycol, triethylene glycol, tetraethylene glycol, 1,2-propanediol, 1,3-propanediol, dipropylene glycol, tripropylene glycol, 1,2-butanediol, 1,3-butanediol, 1,4-butanediol, dibutylene glycol, 1,2,4-bunanetriol, 1,5-pentanediol, 1,6-hexanediol, hexanetriol, 2-n-butyl-2-ethyl-1, 3-propanediol, galactitol, mannitol, 3-methylpentane-1,3,5-triol, pinacol, sorbitol, glycerin, pentaerythritol, dipentaerythritol, trimethylolpropane, trimethylolethane and xylitol, but the invention is not limited thereto. Specifically, triethylene glycol, tetraethylene glycol, dipropylene glycol, tripropylene glycol, sorbitol, glycerin, pentaerythritol, dipentaerythritol, trimethylol propane and xylitol are preferred.

As the monocarboxylic acid to be used in the polyalcohol ester, a known aliphatic monocarboxylic acid, alicyclic monocarboxylic acid and aromatic monocarboxylic acid may be employed, though the monocarboxylic acid is not limited. Specifically, an aromatic monocarboxylic acid is preferable, because a Rt/Ro value of 1.5-6.0 is easily obtained, moisture permeability is suppressed and storage ability is improved.

Examples of the preferable monocarboxylic acid are listed below but the invention is not limited thereto.

A straight or branched chain carboxylic acid having 1 to 32 carbon atoms is preferably employed. The number of carbon atoms is more preferably from 1-20, and specifically preferably from 1-10. The addition of acetic acid is preferable for raising the compatibility with a cellulose ester, and the mixing of acetic acid with another carboxylic acid is also preferable.

As the preferable aliphatic monocarboxylic acid, saturated fatty acids such as acetic acid, propionic acid, butylic acid, valeric acid, caproic acid, enantic acid, caprylic acid, pelargonic acid, capric acid, 2-ethyl-hexane carboxylic acid, undecylic acid, lauric acid, tridecylic acid, myristic acid, pentadecylic acid, palmitic acid, heptadecylic acid, stearic acid, nonadecanic acid, arachic acid, behenic acid, lignocelic acid, cerotic acid, heptacosanic acid, montanic acid, melisic acid and lacceric acid; and unsaturated fatty acids such as undecylenic acid, oleic acid, sorbic acid, linolic acid, linolenic acid and arachidonic acid can be exemplified.

Examples of preferable alicyclic carboxylic acid include cyclopentene carboxylic acid, cyclohexane carboxylic acid, cyclooctane carboxylic acid and derivatives thereof.

Examples of preferable aromatic carboxylic acid include ones formed by introducing an alkyl group into the benzene ring of benzoic acid such as benzoic acid and toluic acid, an aromatic monocarboxylic acid having two or more benzene rings such as biphenylcarboxylic acid, naphthalene carboxylic acid and tetralin carboxylic acid and derivatives of them, and benzoic acid is specifically preferable.

The molecular weight of the polyalcohol is preferably from 300 to 1,500, and more preferably from 350 to 750 though the molecular weight is not specifically limited. Larger molecular weight is preferable for storage ability, while smaller molecular weight is preferable for suppressing moisture permeability and compatibility with a cellulose ester.

The carboxylic acid to be employed in the polyalcohol ester may be one kind or a mixture of two or more kinds of them.

The hydroxyl value of the polyalcohol ester used in the present invention is preferably not more than 10 mgKOH/g and more preferably not more than 6 mgKOH/g. The method to determine the hydroxyl value will be explained below. A smaller hydroxyl value of the polyalcohol ester results in high dimensional stability of a retardation film as well as small environmental variation of retardation values.

Concrete examples of the polyalcohol ester are listed below.

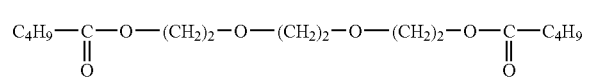

1

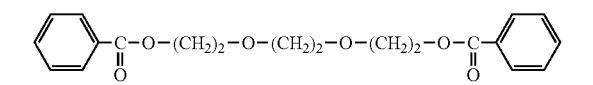

2

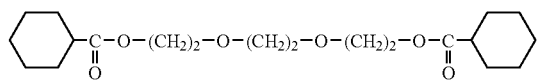

3

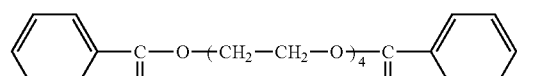

4

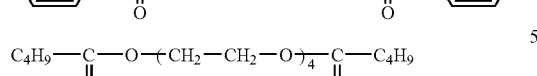

5

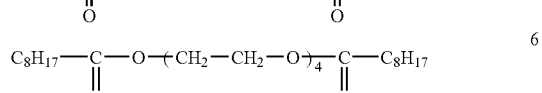

6

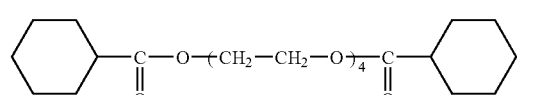

7

8

9

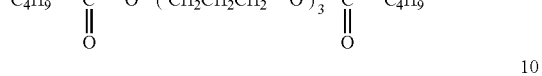

10

11

12

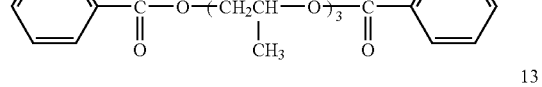

13

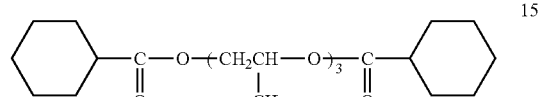

14

15

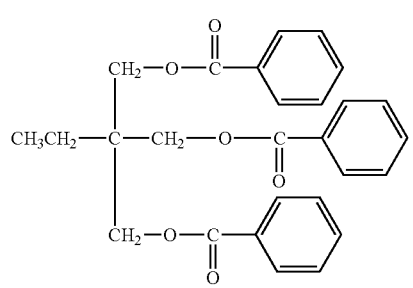

16

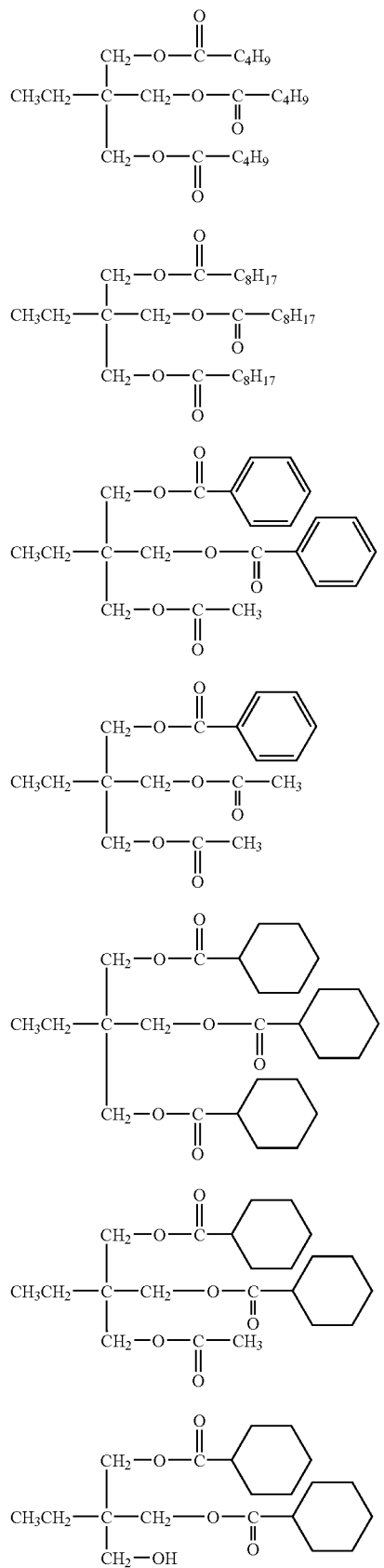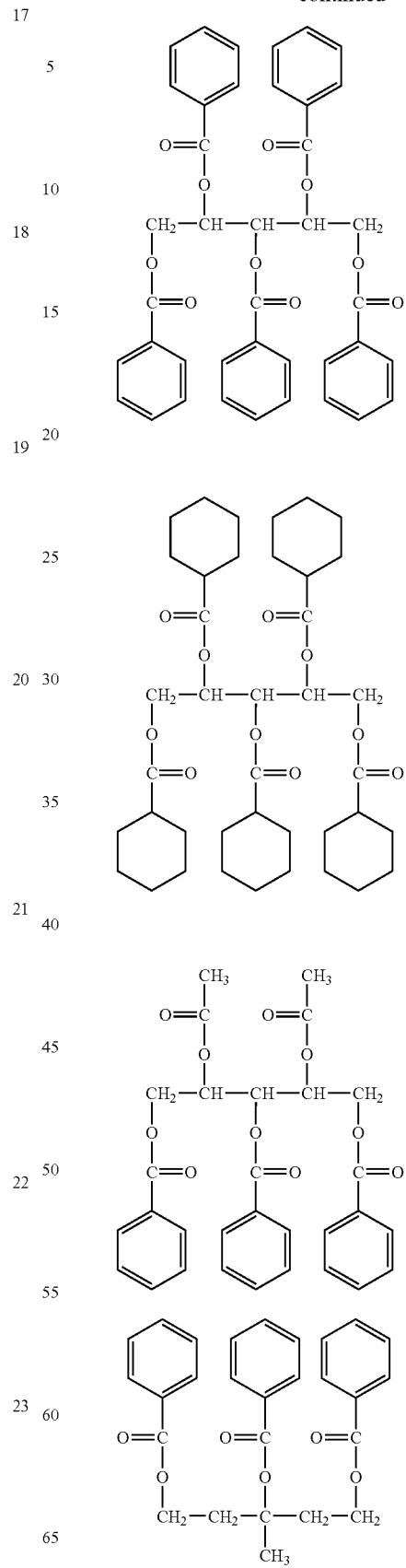

-continued

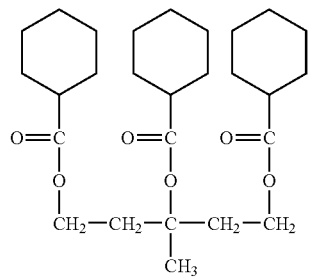
28

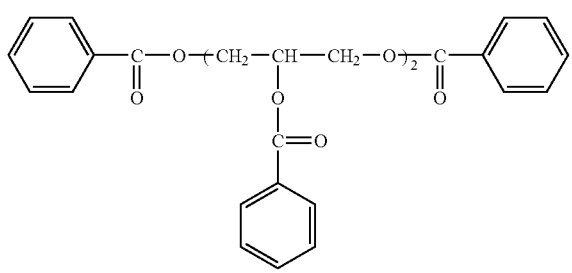
29

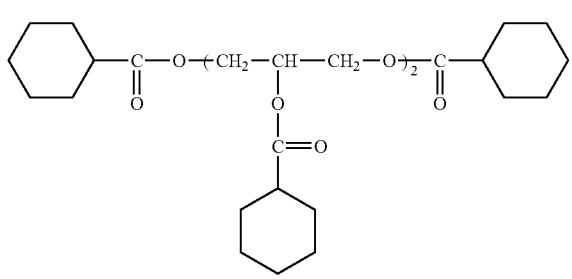
30

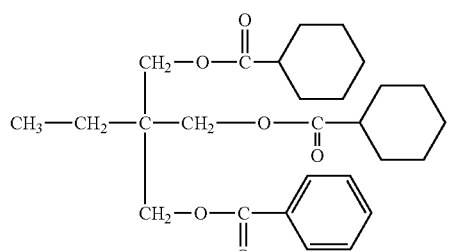
31

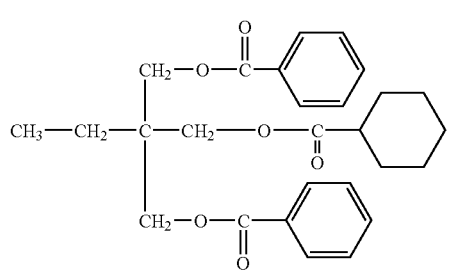
32

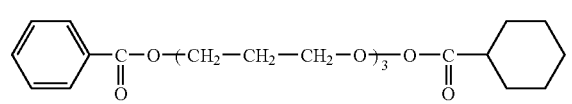
33

-continued

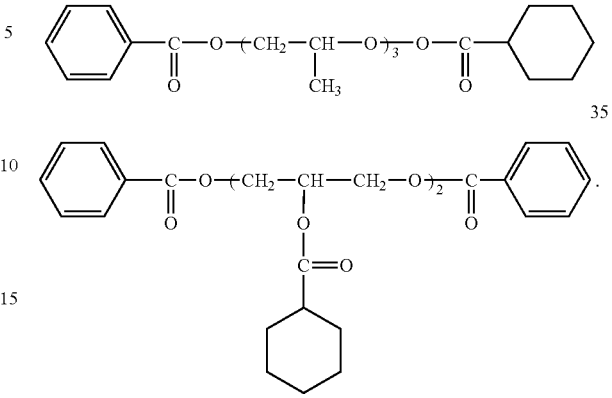
34

35

<Polycarboxylic Acid Esters>

The polycarboxylic acid ester of the present invention is an alcohol ester of a polycarboxylic acid having a valence of 2-20. When the polycarboxylic acid is an aliphatic polycarboxylic acid, the valence is preferably 2-20, and when it is an aromatic polycarboxylic acid, or an alicyclic polycarboxylic acid, the valence is preferably 3-20.

The polycarboxylic acid used for the present invention is represented by the following Formula (2).

$$R_2(COOH)_m(OH)_n \qquad \text{Formula (2)}$$

where, $R_2$ represents an organic group of a valence of m+n, m represents a positive integer of 2 or more, n represents an integer of 0 or more, COOH represents a carboxyl group, and OH represents a alcoholic or a phenolic hydroxyl group. Examples of preferable polycarboxylic acids include: aromatic polycarboxylic acids having a valence of 3 or more, for example, trimellitic acid, trimesic acid and pyromellitic acid, or derivatives thereof; aliphatic polycarboxylic acids, for example, succinic acid, adipic acid, azelaic acid, sebacic acid, oxalic acid, fumaric acid, maleic acid and tetrahydro phthalic acid; and oxypolycarboxylic acids, for example, tartaric acid, tartronic acid, malic acid and citric acid. However, the present invention is not limited thereto. It is preferable to use particularly the oxymultivalent carboxylic acid with respect to the improvement of storage ability.

The alcohol used for the polycarboxylic acid ester of the present invention is not specifically limited, and any known alcohol or phenol in the art is usable. For example, saturated or unsaturated aliphatic alcohol with a normal chain or a branched chain having carbon atoms of 1-32 may be preferably used. The carbon number of the polycarboxylic acid ester is more preferably 1-20 and still more preferably 1-10. Also, preferably usable are, for example: alicyclic alcohols such as cyclopentanol and cyclohexanol or derivatives thereof, and aromatic alcohols such as benzyl alcohol and cinnamyl alcohol or derivatives thereof.

When an oxypolycarboxylic acid is used as a polycarboxylic acid, the alcoholic or phenolic hydroxyl group of the oxypolycarboxylic acid may be esterified using a monocarboxylic acid. Although the following can be listed as examples of a preferable monocarboxylic acid, the present invention is not limited thereto.

Examples of a preferable aliphatic monocarboxylic acid include a fatty acid containing a normal chain or a branched chain having carbon atoms of 1-32. The carbon number of the monocarboxylic acid is more preferably 1-20 and still more preferably 1-10.

Examples of an aliphatic monocarboxylic acid include: saturated fatty acids, for example, acetic acid, propionic acid, butyric acid, valeric acid, caproic acid, enanthic acid, caprylic acid, pelargonic acid, caprin acid, 2-ethylhexane carboxylic acid, undecylic acid, lauric acid, tridecyl acid, myristic acid, pentadecyl acid, palmitic acid, heptadecyl acid, stearic acid, nonadecane acid, arachic acid, behenic acid, lignoceric acid, cerotic acid, heptacosane acid, montanic acid, melissic acid and lacceric acid; and saturated fatty acids, for example, undecylenic acid, oleic acid, sorbic acid, linoleic acid, linolenic acid and arachidonic acid.

Examples of an alicyclic monocarboxylic acid include: cyclopentane carboxylic acid, cyclohexane carboxylic acid, cyclooctane carboxylic acid and derivatives thereof.

Examples of an aromatic monocarboxylic acid include: benzoic acid and toluic acid in which an alkyl group is introduced to the benzene rings of these compounds; aromatic monocarboxylic acids having two or more benzene rings, for example, biphenyl carboxylic acid, naphthalene carboxylic acid and tetrahydronaphthalene carboxylic acid; and derivatives thereof.

Of these, acetic acid, propionic acid and benzoic acid are preferable.

The molecular weight of a polycarboxylic acid ester is not specifically limited, but preferably in the range of 300-1000, and still more preferably in the range of 350-750. Larger molecular weight is preferable for storage ability and smaller molecular weight is preferable for suppressing moisture permeability and compatibility with a cellulose ester.

The alcohol used for the polycarboxylic acid ester may be one kind or in combination of two or more kinds.

The acid value of the polycarboxylic acid ester used in the present invention is preferably not more than 1 mgKOH/g and more preferably not more than 0.2 mgKOH/g, whereby environmental variation of retardation values are minimized.

(Acid Value and Hydroxyl Value)

"Acid value" means the milligrams of potassium hydroxide required to neutralize the acid (carboxyl group existing in a specimen) included in 1 g of sample. Alternatively, "hydroxyl value" means the milligrams of potassium hydroxide required to neutralize the acetic acid bonded to the hydroxyl groups after acetylation of 1 g of sample. The acid value and the hydroxyl value are measured based on JIS K0070.

Examples of a preferable polycarboxylic ester include: triethyl citrate, tributyl citrate, acetyl triethyl citrate (ATEC), acetyl tributyl citrate (ATBC), benzoyl tributyl citrate, acetyl triphenyl citrate, acetyl tribenzyl citrate, dibutyl tartrate, diacetyl dibutyl tartrate, tributyl trimellitate and tetrabutyl pyromellitate.

A total amount of polyalcohol ester and polycarboxylic acid ester incorporated in the retardation film of the present invention is preferably in the range of 3-20% by weight, and more preferably, in the range of 5-15% by weight. When the amount is too large, the dimensional stability may deteriorate, and when the amount is too small, moisture resistance may deteriorate. The ratio of polyalcohol ester and polycarboxylic acid ester incorporated in the retardation film of the present invention is not specifically limited, however, the ratio of (polyalcohol ester):(polycarboxylic acid ester) is preferably 4:6-8:2 and more preferably 5:5-7:3, whereby control of the Rt/Ro ratio within the range of 1.5-6.0 becomes easier.

<Cellulose Ester>

With respect to the cellulose ester used in the present invention, the total acylation degree is preferably in the range of 2.4-2.8, while the Mw/Mn value is preferably in the range of 1.4-3.0.

The cellulose ester used in the present invention is preferably a lower fatty acid ester of cellulose. The lower fatty acid represents one having 6 or fewer carbon atoms, including, for example: cellulose acetate, cellulose propionate, cellulose butyrate and mixed fatty acid esters disclosed in JP-A 10-45804, JP-A 8-231761, and U.S. Pat. No. 2,319,052, for example: cellulose acetate propionate and cellulose acetate butyrate. Among these, cellulose triacetate, and cellulose acetate propionate are specifically preferable.

Most preferable cellulose esters include one having an acyl group having 2-4 carbon atoms as a substituent, and simultaneously satisfying the following Formulas (I) and (II):

$$2.4 \leq X+Y \leq 2.8 \qquad \text{Formula (I)}$$

$$0 \leq X \leq 2.5 \qquad \text{Formula (II)}$$

wherein X represents an acetyl substitution degree, while Y represents a propionyl or butyryl substitution degree. Specifically, cellulose acetate propionate, further specifically cellulose acetate propionate with $1.5 \leq X \leq 2.3$ and $0.1 \leq Y \leq 0.9$ are preferable. A hydroxyl group remains in the part where acyl substitution is not carried out in these cellulose esters. These cellulose esters may be prepared through any method well known in the art.

When the total acyl substitution degree is too small, a larger retardation value is obtained, however, dimensional stability decreases, while haze and water absorption rate increase. Alternatively, when the total acyl substitution degree is too large, a larger retardation value becomes difficult to obtain.

The cellulose ester used in the present invention preferably has a weight average molecular weight (Mw)/number average molecular weight (Mn) value of 1.4-3.0, however, the Mw/Mn value is more preferably 1.4-2.2. By controlling the Mw/Mn value in the above range, (i) a larger retardation value becomes easier to obtain by stretching the cellulose ester film, (ii) haze which appears when the film is stretched decreases and (iii) free volume radius and free volume parameter, determined by positron annihilation lifetime spectroscopy, decrease. One of the reasons for these observations are deduced to be as follows, namely, a smaller Mw/Mn value means that the distribution of molecular weight is smaller, and this results in easier orientation of polymer molecules and formation of homogeneous film having smaller number of pores. However, the Mw/Mn value is preferably not less than 1.4, because when it is less than 1.4, the production cost increases and the molecular weight of the cellulose ester becomes too small.

The average molecular weight and the molecular weight distribution of cellulose ester are determined by a known method in the art using high performance liquid chromatography.

The number average molecular weight and weight-average molecular weight can be computed using these, and the Mw/Mn value can be calculated.

The number average molecular weight (Mn) is preferably in the range of 60000-200000 and more preferably in the range of 70000-170000. A larger molecular weight results in a smaller variation of retardation value due to a variation of humidity, however, when the molecular weight is too large, the viscosity of the solution in which the cellulose ester is dissolved increases and the productivity decreases.

The measurement conditions of the number average molecular weight and weight-average molecular weight using high performance liquid chromatography are as follows:

Solvent: Methylene chloride
Column: Shodex K806, K805, K803G (produced by Showa Denko K.K.)
Column temperature: 25° C.
Sample concentration: 0.1% by weight
Detector: RI Model 504 (produced by GL Sciences Inc.)
Pump: L6000 (produced by Hitachi, Ltd.)
Feed rate: 1.0 ml/min
Calibration: Standardized polystyrene STK standard Polystyrene (made by TOSOH CORP.). A calibration curve is drawn by using 13 samples in the range of Mw=1,000,000-500. The intervals in Mw values among the 13 samples are preferably equal.

Cellulose ester can be prepared using cotton linter, wood pulp or kenaf as starting materials which may be used alone or in combination. It is specifically preferable to use a cellulose ester prepared from cotton linter (hereafter merely referred to as linter) or from wood pulp alone or in combination.

The retardation film of the present invention may further contain additives, such as a plasticizer, a UV absorber, a dye and a matting agent, if necessary.

The retardation film of the present invention may contain a plasticize in addition to a polyalcohol ester and a polycarboxylic acid ester. The plasticizer used in the present invention is not specifically limited, however, for example, a phosphate ester plasticizer, a phthalate ester plasticizer, a glycolate plasticizer and a polyester plasticizer are preferably used. Examples of a phosphate ester plasticizer include: triphenyl phosphate, tricresyl phosphate, cresyl diphenyl phosphate, octyl diphenyl phosphate, diphenyl biphenyl phosphate, trioctyl phosphate and tributyl phosphate. Examples of a phthalate ester plasticizer include: diethyl phthalate, dimethoxy ethyl phthalate, dimethyl phthalate, dioctyl phthalate, dibutyl phthalate, butyl benzyl phthalate and di-2-ethylhexyl phthalate. Examples of a glycolate plasticizer include: butyl phthalyl butyl glycolate, ethyl phthalyl ethyl glycolate and methyl phthalyl ethyl glycolate.

The polyester plasticizer used in the present invention is not specifically limited, however, a ester plasticizer which has an aromatic ring or a cycloalkyl ring in the molecule are applicable. For example, ester plasticizers represented by the following Formula (3) are preferably used:

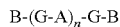

B-(G-A)$_n$-G-B    Formula (3)

where B represents benzene monocarboxylic acid group, G represents an alkylene glycol group having 2-12 carbon atoms, an aryl glycol group having 6-12 carbon atoms, or an oxyalkylene glycol group having 4-12 carbon atoms, A represents an alkylene dicarboxylic acid having 4-12 carbon atoms, or an aryl dicarboxylic acid group having 6-12 carbon atoms, and n represents an integer of 0 or more. A compound represented by Formula (3) is prepared through a reaction similar to the preparation reaction of a common polyester plasticizer.

Examples of a benzene monocarboxylic acid component of the ester plasticizer of the present invention include: benzoic acid, p-tert-butyl benzoic acid, o-toluic acid, m-toluic acid, p-toluic acid, dimethyl benzoic acid, ethyl benzoic acid, n-propyl benzoic acid, aminobenzoic acid and acetoxy benzoic acid, which may be used alone or in combination of two or more acids.

Examples of an alkylene glycol component having 2-12 carbon atoms of the ester plasticizer of the present invention include: ethylene glycol, 1,2-propylene glycol, 1,3-propylene glycol, 1,2-butanediol, 1,3-butanediol, 2-methyl-1,3-propanediol, 1,4-butanediol, 1,5-pentanediol, 2,2-dimethyl-1,3-propanediol (also known as neopentylglycol), 2,2-diethyl-1,3-propanediol (also known as 3,3-dimethylol pentane), 2-n-butyl-2-ethyl-1,3-propanediol (also known as 3,3-dimethylol heptane), 3-methyl-1,5-pentanediol-1,6-hexanediol, 2,2,4-trimethyl-1,3-pentanediol, 2-ethyl-1,3-hexanediol, 2-methyl-1,8-octanediol, 1,9-nonanediol, 1,10-decanediol, 1,12-octadecanediol, which may be used alone or in combination of two or more glycols.

Examples of an oxyalkylene glycol component having 4-12 carbon atoms of the aromatic terminal ester of the present invention include: diethylene glycol, triethylene glycol, tetraethylene glycol, dipropylene glycol and triropylene glycol, which may be used alone or in combination of two or more glycols.

Examples of an alkylene dicarboxylic acid component having 4-12 carbon atoms of the aromatic terminal ester of the present invention include: succinic acid, maleic acid, the fumaric acid, glutaric acid, adipic acid, azelaic acid, sebacic acid and dodecane dicarboxylic acid, which may be used alone or in combination of two or more acids. Examples of an arylene dicarboxylic acid component having 6-12 carbon atoms include: phthalic acid, terephthalic acid, 1,5-naphthalene dicarboxylic acid and 1,4-naphthalene dicarboxylic acid.

The number average molecular weight of the ester plasticizer used in the present invention is preferably 250-2000, and more preferably 300-1500. The acid value of the ester plasticizer used in the present invention is preferably not more than 0.5 mgKOH/g and more preferably not more than 0.3 mgKOH/g. The hydroxyl value of the ester plasticizer used in the present invention is preferably not more than 25 mgKOH/g and more preferably not more than 15 mgKOH/g.

Examples of a synthetic method of an aromatic terminal ester plasticizer are shown below:

<Sample No. 1 (Aromatic Terminal Ester Sample)>

In a container, 365 weight parts (2.5 moles) of adipic acid, 418 weight parts (5.5 moles) of 1,2-propylene glycol, 610 weight parts (5 moles) of benzoic acid and 0.30 weight part of tetra-isopropyl titanates (as a catalyst) were loaded at a time, and, while stirring under a nitrogen atmosphere, the mixture was heated at 130-250° C. until the acid value decreased to 2 or less. The excess monovalent alcohol was refluxed using a reflux condenser and produced water was continuously removed. Then, the container was evacuated to $1.33 \times 10^4$ Pa and, finally, to $3.99 \times 10^2$ Pa at 200-230° C., while the distillate was removed. The product was filtered to obtain an aromatic terminal ester having the following features:

| | |
|---|---|
| Viscosity (25° C.): | 815 mPa · s |
| Acid value: | 0.4 |

<Sample No. 2 (Aromatic Terminal Ester Sample)>
An aromatic terminal ester having the following features was prepared in the same manner as Sample No. 1 except that 365 weight parts (2.5 moles) of adipic acid, 610 weight parts (5 moles) of benzoic acid, 583 weight parts (5.5 moles) of diethylene glycol and 0.45 weight part of tetra-isopropyl titanates (as a catalyst) were used.

| | |
|---|---|
| Viscosity (25° C.): | 90 mPa · s |
| Acid value: | 0.05 |

<Sample No. 3 (Aromatic Terminal Ester Sample)>
An aromatic terminal ester having the following features was prepared in the same manner as Sample No. 1 except that 365 weight parts (2.5 moles) of adipic acid, 610 weight parts (5 moles) of benzoic acid, 737 weight parts (5.5 moles) of dipropylene glycol and 0.40 weight part of tetra-isopropyl titanates (as a catalyst) were used.

| | |
|---|---|
| Viscosity (25° C.): | 134 mPa · s |
| Acid value: | 0.03 |

These plasticizers may also be used in combination. The amount of plasticizer used in a retardation film is preferably 3-20% by weight.

<UV Absorbing Agent>
The UV absorbing agent used in the present invention preferably has high absorbance of UV rays of which wavelength is not more than 370 nm, from the viewpoint of durability of the LCD, and preferably has low absorbance of visible rays of which wavelength is not less than 400 nm, from the viewpoint of an excellent display performance of the LCD. The transmittance at a wavelength of 370 nm is preferably not more than 10 percent and is more preferably not more than 5 percent and still more preferably not more than 2 percent.

As an UV absorbing agent used in the present invention, specifically preferable is a UV absorbing agent having 2 or more aromatic rings in the molecule.

Examples of a UV absorbing agent used in the present invention include: oxybenzophenone, benzotriazol, salicylate ester, benzophenone, cyanoacrylate, triazine, nickel complex salt and inorganic particles, however, the present invention is not limited thereto. UV absorbing agents preferably used in the present invention include a benzotriazole UV absorbing agent and a benzophenone UV absorbing agent, both of which are extremely transparent and have a superior effect of preventing degradation of the polarizing plate or liquid crystal display. Among these, a benzotriazole UV absorbing agent having reduced coloring is specifically preferrable. Specific examples of a UV absorbing agent include TINUVIN 109, TINUVIN 171, TINUVIN 326, TINUVIN 327 and TINUVIN 328 which are manufactured by Chiba Specialty Chemicals Co. However, the present invention is not limited thereto.

The above UV absorbing agents may be used alone or in combination of two or more UV absorbing agents.

A polymer UV absorbing agent is also preferably used as a UV absorbing agent in the present invention, specifically, a polymer UV absorbing agent disclosed in JP-A 6-148430.

The addition methods of said UV absorbing agents are as follows. They may be dissolved in organic solvents such as alcohol (e.g., methanol, ethanol or butanol), methylene chloride, methyl acetate, acetone and dioxolane, and the resulting solution of which is added to a dope. Alternatively, they may be added directly to a dope. UV absorbing agents such as inorganic powder, which are not soluble in organic solvents, may be dispersed into a mixture of organic solvents and cellulose ester, employing a dissolver or a sand mill, and then added to a dope.

The employed amount of UV absorbing agents may vary depending on the type of UV absorbing agent or on the use condition, however, when the dried layer thickness of the cellulose ester film is 30-200 μm, the content of UV absorbing agents is preferably 0.5-4.0% by weight based on the weight of the cellulose ester film, and more preferably 0.6-2.0% by weight.

In the retardation film of the present invention, microparticles, for example, silica microparticles may be added as a matting agent. Microparticles used as a matting agent are preferably subjected to surface treatment with an organic compound in order to decrease haze.

Examples of a preferable organic compound for the surface treatment include: a halosilane, an alkoxysilane, silazane and siloxane.

Microparticles having lager average diameter exhibit higher slipping effect and those having lower average diameter are superior in the transparency. The average diameter of the primary microparticles is preferably 5-50 μm and more preferably 7-20 μm.

Examples of silica microparticles include: Aerosil 200, 200V, 300, R972, R972V, R972CF, R974, R202, R805, R812, OX50 and TT600, each manufactured by Nihon Aerosil Co., Ltd., and Aerosil 200, 200V, R972, R972V, R974, R202, R805 and R812 are preferable.

Further, for example, an antioxidant, an acid acceptor, dye, may be contained in the retardation film.

Each additive may be added in a batch process to a dope solution in which cellulose ester is dissolved or may be in-line added by preparing a solution containing the additive. In order to reduce the load given to a filter while a solution containing matting agent is filtered, a part of or all of the matting agent may be in-line added to the retardation film.

In the solution used for in-line addition of a matting agent, a small amount of cellulose ester is preferably added to the solution, in order to increase the compatibility of the matting agent solution with the dope solution. The amount of added cellulose ester is preferably 1-10 weight parts and more preferably 3-5 weight parts in 100 weight parts of solvent.

In the present invention, an in-line mixer, for example, a static mixer (produced by Toray Engineering Co., Ltd.) or SWJ (Hi-mixer produced by Toray Engineering Co., Ltd.) is preferably used for in-line addition and mixing of a solution containing an additive and a small amount of cellulose ester with a dope solution in which cellulose ester is dissolved. In a process in which an in-line mixer is used, dissolution of concentrated materials under a high pressure is preferably carried out. The container used for the high pressure dissolution is not specifically limited, provided that it enables heating and stirring under high pressure. The high pressure container is preferably equipped with a thermometer and a pressure gauge.

<Free Volume Radius and Free Volume Parameter>
The retardation film of the present invention preferably contains a polyalcohol, a polycarboxylic acid ester and a cellulose ester of which total acylation degree is 2.4-2.8 and the Mw/Mn value is 1.4-3.0. Further, the retardation film preferably has a free volume radius of 0.25-0.31 nm and a free volume parameter of 1.0-2.0.

The free volume in the present invention represents vacant area which is not occupied by the cellulose ester chain. This free volume can be measured using positron annihilation lifetime spectroscopy. More specifically, by measuring the time from injection of positrons into a cellulose ester film to the annihilation of the positrons, namely annihilation lifetime of positrons, size and numerical concentration of free volume holes are nondestructively estimated from the annihilation lifetime of positrons.

(Measurement of Free Volume Radius by Positron Annihilation Lifetime Spectroscopy, and Free Volume Parameter)

A positron annihilation lifetime and relative intensity were measured under the following measurement condition.

(Measurement Condition)

| | |
|---|---|
| Positron source: | 22NaCl (intensity: 1.85 MBq) |
| Gamma-ray detector: | Plastic scintillator + Photomultiplier tube |
| Apparatus time resolution: | 290 ps |
| Measurement temperature: | 23° C. |
| Total number of counts: | 1 million counts |
| Specimen size: | 20 mm × 15 mm × 2 mm 20 pieces of 20 mm × 15 mm sized films were piled to prepare an about 2 mm thick sample. The sample was dried under vacuum 24 hours. |
| Irradiation area: | A circle of about 10 mm in diameter |
| Time per channel: | 23.3 ps/ch |

According to the above measurement condition, positron annihilation lifetime spectroscopy was carried out. A three component analysis using a nonlinear least-square method was carried out for the obtained results. When the annihilation times were referred to as, in small order, $\tau_1$, $\tau_2$ and $\tau_3$ and the corresponding intensities were referred to as I1, I2 and I3 (I1+I2+I3=100%), respectively, using the largest annihilation time $\tau_3$, a free volume radius R3 (nm) was determined using the following formula. The larger the $\tau_3$ value is, the larger the estimated free volume is.

$$\tau_3 = (1/2)[1-\{R3/(R3+0.166)\}+(1/2\pi)\sin\{2\pi R3/(R3+0.166)\}]^{-1}$$

where, 0.166 (nm) represents the thickness of the electronic layer which is exuding from the wall of a hole.

The free volume parameter VP was determined by the following formula.

$$V3 = \{(4/3)\pi(R3)^3\} (nm^3)$$

$$VP = I3(\%) \times V3 (nm^3)$$

Since I3 (%) is equivalent to the relative number concentration of a hole, VP is equivalent to the relative amount of holes.

The above measurements were repeated twice and the mean values were calculated for the determination.

Evaluation of a free volume in polymer by positron annihilation spectroscopy is explained in, for example, MATERIAL STAGE vol. 4, No. 5, 2004, pp. 21-25, The TRC News, No. 80 (July, 2002) PP. 20-22 (published by Toray Research Center), and "BUNSEKI (Analysis)", 1988, pp. 11-20".

The free volume radius of the retardation film of the present invention is preferably 0.250-0.310 nm and is more preferably 0.270-0.305 nm. In an industrial process, it is rather difficult to produce a cellulose ester retardation film having a free volume radius of less than 0.250 nm or a free volume parameter less than 1.0. The retardation film of the present invention having a free volume radius of 0.250-0.310 nm is preferable since it enables the effect of the present invention. The free volume parameters are preferably in the range of 1.0-2.0, and more preferably in the range of 1.2-1.8. When the free volume parameter is less than 1.8, patch of retardation becomes difficult to occur.

The method of controlling the free volume radius or the free volume parameter of the retardation film of the present invention in a prescribed range is not specifically limited, however, the following method may be applicable.

A retardation film having a free volume radius of 0.250-0.310 nm and a free volume parameter of 1.0-2.0, both of which are determined by positron annihilation lifetime spectroscopy may be obtained, for example, by the following method: (i) casting a dope containing a polyalcohol ester, a polycarboxylic acid ester, and a cellulose ester to form a web; (ii) stretching the web while the web contains residual solvent; (iii) drying the web until the amount of residual solvent decreases to 0.3% to obtain a cellulose ester film; (iv) heat treating the cellulose ester film at 105-150° C. in a film transportation process under a circumstance in which the rate of atmosphere replacement of not less than 12 times/h, or more preferably 12-45 times/h.

The rate of atmosphere replacement is the number of times replacing the atmosphere of a heat treatment chamber by fresh-air per unit time, provided that the volume of the heat treatment chamber is expressed as V ($m^3$) and the amount of fresh-air sent to the heat treatment chamber is expressed as FA ($m^3/h$). Fresh-air does not include the air which is recycled and circulating, among the air sent to the heat treatment chamber but includes the air containing no evaporated solvent nor evaporated plasticizer, or the air from which evaporated solvent or evaporated plasticizer are removed.

Rate of atmosphere replacement=$FA/V$(times/h)

When the heat treatment temperature exceeds 155° C., or when it is lower than 105° C., the effect of the present invention tends not be acquired.

As the operating temperature, it is still more preferable that the operating temperature is in the range of 110-150° C. Further, preferable is that the heat treatment is carried out under the condition in which the rate of atmosphere replacement is 12 times/h or more. When it is less than 12 times/h, the effect of the present invention tends not be acquired.

When the rate of atmosphere replacement is 12 times/h or more, the concentration of the plasticizer evaporated from the retardation film in the atmosphere is thoroughly reduced, accordingly, re-deposition of the plasticizer to the retardation film is also reduced. This is assumed to contribute in attaining the effect of the present invention. By incorporating both polyalcohol ester and polycarboxylic acid ester in the retardation film, evaporation of the plasticizer in the heat treatment process is suppressed, which is also assumed to have contributed in attaining the effect of the present invention.

When the rate of atmosphere replacement is increased more than necessary, the production cost increases and due to the fluttering of the web, retardation patch increases. Accordingly, it is not recommended that the rate of atmosphere replacement is increased more than necessary, however, after the web was thoroughly dried and the amount of residual solvent is considerably decreased, it can be increased. However, the rate of atmosphere replacement of 45 times/h or more is not practical since the production cost drastically increases. The heat treatment under the rate of atmosphere replacement of 12 times/h or more is preferably carries out within 1 minute-1 hour. If the treatment time is less than 1 minute, the free volume radius within a prescribed range may be difficult to obtain, while, when it is not more than 1 hour, the change of retardation value is allowable.

Further, in this process, a pressurizing treatment of the retardation film in the thickness direction may also be effectively carried out to control the free energy volume radius and the free volume parameter within more preferable range. The pressure is preferably 0.5-10 kPa. The amount of residual solvent at the stage when the pressurizing treatment is carried out is preferably less than 0.3. At 0.3% or more, a free volume radius cannot fully be reduced.

When a retardation film is not subjected to the above mentioned treatments, the free volume radius may become larger than 0.315

<Manufacturing Method of Retardation Film>

The manufacturing method of the cellulose ester retardation film of the present invention will now be explained.

The manufacturing method of the retardation film of the present invention contains the processes of (i) a dope preparing process in which cellulose ester and an additive, are dissolved in a solvent, (ii) a flow-casting process in which a dope is flow-cast on a belt-like or a drum-like metal support, (iii) a drying process in which a flow-cast dope is dried to form a web, (iv) a peeling process in which a dried web is peeled from the metal support, (v) a stretching process, (vi) a further drying process, (Vii) a heat treatment process and (viii) a winding process of the cooled cellulose ester film.

The retardation film of the present invention preferably contain 70-95% by weight of cellulose ester based on the weight of solid component of the retardation film.

The dope preparation process will now be explained. In the dope preparation process, a higher content of cellulose ester in the dope is preferable since duration of the drying process following the flow-casting process is shortened, however, a too high content may result in loss of filtration accuracy. Preferable content of cellulose ester is from 10-35% by weight and more preferably from 15-25% by weight.

A solvent may be used alone, however, two or more solvents may also be used together. A mixture of a good solvent and a poor solvent is more preferably used to increase manufacturing efficiency. A mixed solvent being rich in a good solvent is preferable to increase solubility of cellulose ester. The preferable mixing ratios are from 70 to 98 percent by weight of a good solvent, and from 2 to 30 percent of a poor solvent. Herein, a good solvent is described as being capable of dissolving cellulose ester with a single use, and a poor solvent as being incapable of dissolving nor swelling cellulose ester alone. Sometimes, a solvent works as a good solvent of a cellulose ester, and sometimes as a poor solvent depending on the average acylation degree (degree of acyl substitution) of the cellulose ester. For example, acetone is a good solvent for an acetic ester of cellulose of which the acetylation degree is 2.4, as well as for cellulose acetatepropionate, however, it is a poor solvent for cellulose acetate of which acetylation degree is 2.8.

Example of good solvents used in the present invention include: an organic halide (such as methylene chloride), dioxolane, acetone, methyl acetate and methyl acetoacetate, of these, methylene chloride and methyl acetate are specifically preferable. However, the present invention is not specifically limited thereto.

Examples of poor solvents used in the present invention include: methanol, ethanol, n-butanol, cyclohexane and cyclohexanone, however, the present invention is not specifically limited thereto. A dope may preferably contain from 0.01 to 2 percent by weight of water.

In the process of preparing a dope, cellulose ester is dissolved using a common method. Dissolving cellulose ester at a higher temperature is possible when the heating is carried out under a higher pressure. Formation of a gel or an insoluble agglomerate (known as "Mamako" in Japanese which represents insoluble residue when powder is dissolved in a solvent) may be avoided when the dissolving temperature is higher than the ambient pressure boiling point of the mixed solvents, and simultaneously the temperature is in the range where the mixed solvents do not boil under the applied higher pressure. The following dissolving method is also preferable, in which cellulose ester is swollen in a mixture of good and poor solvents followed by adding good solvents to dissolve the swollen cellulose ester.

Pressure may be applied by injecting an inert gas such as nitrogen or by increasing the vapor pressure of the solvents by heating. Heating is preferably carried out from the outside of the container. A jacket type heater is preferable because the temperature is easily controlled.

A higher dissolving temperature is preferable with respect to the solubility of the cellulose ester, however, too high a temperature may lower the productivity because the pressure also becomes very high. The dissolving temperature is preferably 45-120° C., more preferably 60-110° C. and still more preferably 70-105° C. The pressure should be controlled not to allow boiling at the set temperature.

A low temperature dissolution method is also preferably utilized, by which cellulose ester is successfully dissolved in solvents such as methyl acetate.

In the next process, the cellulose ester solution thus prepared is filtered using an appropriate filter material. A filter material with a smaller absolute filtration accuracy is more preferable for removing insoluble materials, however, too small a filtration accuracy easily cause clogging up of the filter. The absolute filtration accuracy of the filter is preferably not larger than 0.008 mm, more preferably 0.001-0.008 mm and still more preferably 0.003-0.006 mm.

The filter material used in the present invention is not specifically limited, and plastic filters (such as polypropylene and Teflon(R) as well as metal (alloy) filters (such as stainless steel) are preferable, since these materials are free from peeling of a fiber, which may occur when fibrous material is used. Impurities and, specifically, luminescent foreign materials contained in the cellulose ester are preferably diminished or entirely removed by filtering.

"Luminescent foreign materials" denote impurities which are observed as bright spots when a cellulose ester film is placed between two polarizing plates arranged in a crossed Nicols state, illuminated with a light from one side and observed from the other side. The number of luminescent foreign materials of larger than 0.01 mm in diameter is preferably less than 200 per $cm^2$, more preferably less than 100 per $cm^2$ and still more preferably from 0 to 10 per $cm^2$. The number of luminescent foreign materials of less than 0.01 mm in diameter is preferably minimal.

The dope may be filtered by any common method. One of these preferable filtering methods is to filter the dope at temperatures which are higher than the ambient pressure boiling point of the mixed solvents, and simultaneously in the range where the mixed solvents do not boil under a higher pressure. This method is preferable because the pressure difference between before and after filtering is reduced. The filtering temperature is preferably from 45 to 120° C., more preferably from 45 to 70° C. and still more preferably from 45 to 55° C.

The pressure applied during filtering is preferably low, being preferably less than 1.6 MPa, more preferably less than 1.2 MPa and still more preferably less than 1.0 MPa.

Flow-casting of a dope will be explained below:

A metal support polished to a mirror finished surface is used in the flow-casting process. A polished stainless steel belt or a plated cast drum is used as a metal support. The width of the support is preferably from 1 to 4 m. The surface temperature of the metal support is preferably from −50° C. to a temperature just below the boiling point of the solvent. A relatively high temperature of the support is more preferable because the web is more quickly dried, however, too high a temperature may cause foaming or loss of flatness of the web. The temperature of the support is appropriately determined in the range of 0-100° C., however, preferably 5-30° C. Another preferable method is that a web is gelated by cooling the drum followed by peeling the web from the drum while the web still contains much solvent. The method to control the temperature of the support is not specifically limited and a method of blowing warm or cool air onto the support or to apply warm water on the rear side of the support is acceptable. The warm water method is more preferable because the temperature of the metal support becomes stable in a shorter time due to more efficient thermal conduction. In the case when warm air is used, in order to avoid the lowering of the web temperature due to latent heat of evaporation, the air temperature should be higher than the desired temperature of the support while avoiding foaming of the web. Drying process of the web is preferably carried out effectively by changing the temperatures of the warm air and the support during the process between flow-casting and peeling.

In order to obtain a cellulose ester film with a sufficient flatness, the residual solvent content of the web when it is peeled from a metal support is preferably 10-150% by weight, however, it is more preferably 20-40% by weight or 60-130% by weight. The residual solvent content is specifically more preferably 20-30% by weight or 60-130% by weight.

The residual solvent content of the web is defined by the following formula:

Residual solvent content (% by weight)=$\{(M-N)/N\} \times 100$ where M represents the weight of a sample of the web collected in the manufacturing process or after manufacturing, and N represents the weight of the same sample after it was dried at 115° C. for 1 hour.

In the drying process of a cellulose ester film, the film is peeled from the support and further dried until the residual solvent decreases below not more than 0.5%.

The peeled web is generally dried by a roll drying method (the web is passed through many rolls alternately provided up and down in a staggered array), or by a tenter method in which both edges of the web are clipped while the web is being transported.

The web may be stretched in the film transportation direction by a peeling tension or by a transporting tension when or after the web is peeled from the support. The web is preferably peeled from the support with a tension of 210 N/m or more and more preferably with a tension from 220 to 300 N/m in order to stretch the film in the film transportation direction just after peeling.

An example of the stretching process (also referred to as the tenter process) of the present invention will now be explained using FIG. 2.

Figure 2:
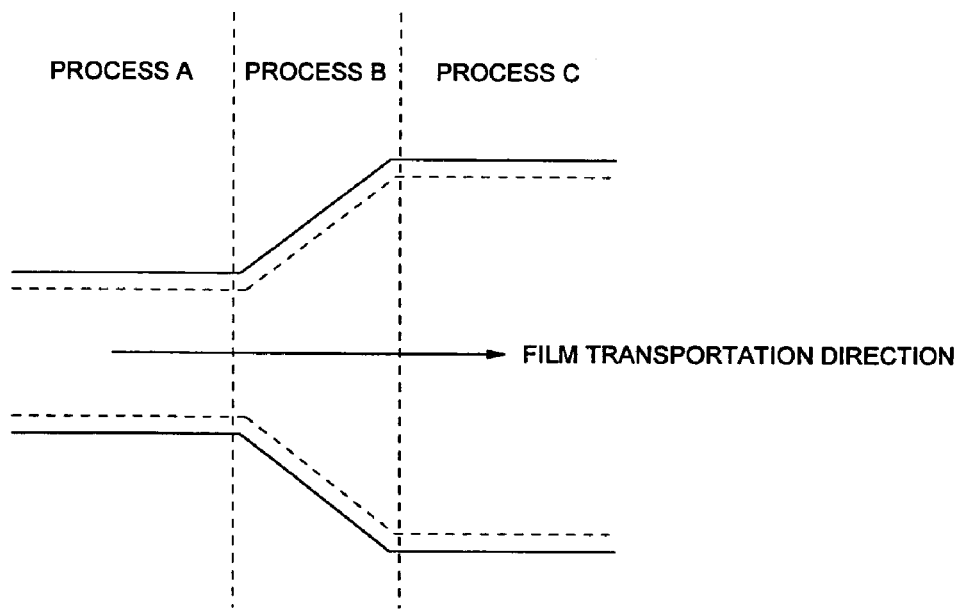
FIG. 2 is the schematic view showing a typical example of a tenter process used in the present invention.

Process A of FIG. 2 is the process where a web conveyed from the peeling and transporting process (not illustrated, hereafter referred to as Process D0) is held by clipping both edges. In Process B, the film is stretched in the lateral direction (perpendicular to the film transportation direction) with the stretching angle illustrated in FIG. 1. In Process C, stretching is completed and the film is transported to the next production process while being clipped.

A slitter which trims both edges of the film is preferably provided at any position between just after the web is peeled and just after Process B or C. Specifically preferably, a slitter is provided just before Process A. When a stretching was carried out under the same condition, a stretched film which is slit before Process B showed an improved orientation angle distribution of slow axes than a stretched film without slitting.

This may be because an undesirable stretching in the film transportation direction is suppressed between the peeling process and Process B where the film still contains much solvent.

In the tenter process, a different temperature domain may be purposely provided in the film to improve the orientation angle distribution. Also a neutral domain is preferably provided between two different temperature domains to prevent interference.

The stretching process may be divided into several steps. Biaxial stretching in both film transportation direction and the lateral direction is also preferable. Biaxial stretching may be carried out simultaneously or in series of steps. In stepped stretching, stretching may be carried out alternately in different directions or stepwise in one direction. Stretching alternately in different directions may also be added to the sequence of stepped stretching in one direction.

It is specifically preferable that the peeled web is transported while drying, followed by stretching the web in the lateral direction by holding both edges of the web using pins or clips in the tenter process whereby, a prescribed retardation value is provided to the web. The stretching may be carried out only in the lateral direction or simultaneously in the lateral direction and the film transporting direction (biaxial stretching). The stretching ratio of the web is preferably 1.05-2 and more preferably 1.15-1.5. The web may shrink in the film transportation direction when it is stretched in the lateral direction, where the stretching ratio is preferably 0.8-0.99 and more preferably, 0.9-0.99. The enlarging ratio of the area of the web after stretching (or shrinking) in the lateral direction and in the film transportation direction is preferably 1.12-1.44 and more preferably 1.15-1.32. The enlarging ratio of the area of the web is obtained by (stretching ratio in the lateral direction)×(stretching ratio in the film transporting direction).

The term "stretching direction" used in the present invention usually represents the direction in which stretching tension is applied, however, when a web is biaxially stretched in a plurality of steps, the "stretching direction" may mean the direction in which the final stretching ratio of the web becomes larger (which is usually the slow axis direction) than the stretching ratio in the direction perpendicular to the above mentioned direction.

It is well known that, when a web is stretched in the lateral direction of the web, the dispersion of orientations of slow axes (hereafter referred to as a orientation angle dispersion) becomes larger. In order to conduct stretching in the lateral direction of a web while the ratio of Rt to Ro is kept constant and the orientation angle dispersion is kept small, relationships among web temperatures of processes A, B and C exist, namely, the following relationships are preferably satisfied: Ta≦(Tb−10), or Tc≦Tb, and more preferably the both relationships are simultaneously satisfied: Ta≦(Tb−10) and Tc≦Tb, wherein Ta, Tb and Tc represents temperatures in Celsius at each end of Processes A, B and C, respectively.

In order to decrease the above mentioned orientation angle dispersion, the temperature increasing rate of the web in Process B is preferably 0.5-10° C./s.

The stretching duration in Process B is preferably shorter, however, a lower limitation of the stretching duration may be prescribed to maintain uniformity of the web. The temperature of Process B is preferably 40-180° C., and more preferably 100-160° C.

In the tenter process, the coefficient of heat transfer may be constant or may be changed. The heat transfer coefficient is preferably in the range of $41.9 \times 10^3$-$419 \times 10^3$ $J/m^2h$, more preferably $41.9 \times 10^3$-$209.5 \times 10^3$ $J/m^2h$, and further more preferably $41.9 \times 10^3$-$126 \times 10^3$ $J/m^2hr$.

The stretching rate in the lateral direction in Process B may be constant or may be changed. The stretching rate is preferably in the range of 50-500%/minute, more preferably 100-400%/minute, and most preferably 200-300%/minute.

In the tenter process, the distribution of environmental temperature in the lateral direction of the web is preferably smaller to improve uniformity of a web. The distribution of environmental temperature in the lateral direction in the tenter process is preferably within ±5° C., more preferably within ±2° C., and most preferably within ±1° C. By decreasing the distribution of environmental temperature, the temperature distribution in the lateral direction of a web may also be decreased.

In Process C, the width of a web held by a tenter is preferably reduced. Specifically, the width is preferably reduced to 95 to 99.5% of the width in the former process.

After a web is treated in the tenter process, a subsequent-drying process (hereafter referred to as Process D1) is preferably provided. The web is preferably subjected to a heat treatment in the temperature range of 50 to 160° C., more preferably, 80 to 140° C., and most preferably 110 to 130° C.

In Process D1, the distribution of environmental temperature in the lateral direction of the web is preferably smaller to improve uniformity of the web. The distribution of environmental temperature in the lateral direction is preferably within ±5° C., more preferably within ±2° C., and most preferably within ±1° C.

Although the tension applied to the web while the film is being transported is affected by several factors, for example: the property of a dope, the amount of residual solvent at the peeling process and Process D0, and the temperature of Process D1, the film tension is preferably 120-200 N/m, more preferably 140-200 N/m, and most preferably 140-160 N/m.

In order to reduce further stretching in the film transportation direction of the film in Process D1, a tension cut roll (an additional roll which reduces the tension of the film while the film is conveyed) is preferably provided.

The means to dry the web is not specifically limited, and, for example, heated air, IR rays, a heated roll and microwave are applicable. With respect to the easiness, heated air is preferable.

The drying temperature in the drying process is preferably increased stepwise in the range of 30-160° C.

In the present invention, the free volume and the free volume parameter are controlled in prescribed ranges by heat treating the web as described above after the drying process of the web.

In the production process of the retardation film of the present invention, the retardation film is preferably subjected to a press treatment with a pressure of 0.5-10 kPa in the thickness direction in the heat treatment process after the drying process. The retardation film is preferably pressed uniformly using, for example nip rolls. When the retardation film is pressed in the thickness direction, the web is preferably thoroughly dried. The free volume and the free volume parameter are controlled by applying pressure of 0.5-10 kPa from both upside and downside of the retardation film. Specifically, two nip rolls arranged in parallel are used, or rolls such as calendar rolls may be used. The temperature in the press treatment is preferably 105-150° C.

Preferably conducted is the trimming of both edges of the film using a slitter after the drying is completed and before winding in a roll, to obtain a roll of the preferable shape. Further, both the edges of the retardation film is preferably subjected to a knurling treatment.

Knurling processing is carried out by pressing a heated emboss roll. Since the emboss roll has a fine convexo-concave surface, by pressing this on the edges of the retardation film, a film having slightly bulky edges.

The depth of the knurling treatment on both the edges of the retardation film are preferably 4-20 μm and the width of the knurling treatment is preferably 5-20 mm.

The knurling processing is preferably provided after the drying process and before the film winding process.

A multilayer retardation film formed by a co-casting method using a plurality of dope solutions is also preferable. The multilayer retardation film can also have a layer containing a plasticizer. The layer containing a plasticizer may be a core layer, a skin layer or both the layers.

The center-line surface roughness (Ra) of the surface of the retardation film of the present invention is preferably 0.001-1 μm.

In the retardation film of the present invention, the in-plane retardation value Ro defined by the following formula is preferably in the range of 30-300 nm, and more preferably in the range of 50-300 nm. The out-of-plane retardation value in the thickness direction Rt is preferably in the range of 100-400 nm, and more preferably in the range of 130-400 nm. Specifically, the Rt/Ro value is preferably in the range of 1.5-6.0.

In JP-A No. 2004-198904, a retardation film containing a polyalcohol ester plasticizer is disclosed, however, no disclosure of co-use of a polyoxycarboxylic acid ester is not found. This may be because, it has been thought that, when these materials are used in combination, the environmental variation of the retardation effect becomes larger, and that, for example, a citrate ester, which is one of the polycarboxylic acid esters, has a property to decrease optical anisotropy, which is not suitable for obtaining the Rt/Ro value desirable for the present invention. In the present invention, the use of a polyalcohol ester plasticizer and a polyoxycarboxylic acid ester plasticizer in combination results in avoiding rupture of the film which has been a problem to be overcome for the retardation film and also avoiding haze which may occur when the film is stretched to obtain the desired Rt/Ro value. More preferably, the hydroxyl value of the polyalcohol ester plasticizer and the acid value of the polyoxycarboxylic acid ester plasticizer are controlled within the prescribed ranges, whereby increase in the environmental variation of the retardation values is avoided.

The Ro and Rt values and the angle between the slow axis and the lateral direction of the long-roll retardation film, θ0(°) were determined by using an automatic birefringence meter. The Ro and Rt values were calculated according to the following equations using nx, ny and nz values determined by using an automatic birefringence meter: KOBRA-21ADH (manufactured by Oji Keisokukiki Co., Ltd.) under a condition of 23° C. and 55% RH at a wavelength of 590 nm.

$$Ro=(nx-ny) \times d$$

$$Rt=\{(nx+ny)/2-nz\} \times d$$

wherein nx represents an in-plane refractive index in a slow axis direction; ny represents an in-plane refractive index in a fast axis direction; nz represents an out-of-plane refractive index in the thickness direction; and d represents a thickness (nm) of the retardation film.)

Although a thicker retardation film is preferable in obtaining a larger retardation value, while a thinner one is advantageous in avoiding corner spots and variation of Rt due to humidity change. In order to attain both of the above merits, the thickness of the retardation film of the present invention is preferably 40-85 μm, more preferably 40-70 μm. The width of the retardation film of the present invention is preferably 1-4 m and specifically more preferably 1.4-2 m.

Corner spots mean light leakage at the corner of an LCD while a solid black is displayed, which is observed in a darkroom after a backlight unit of the LCD is continuously turned on for 5 hours.

The polarization degree p of the retardation film of the present invention is preferably 0.9990 or more, more preferably 0.9999 or more, still more preferably 0.99995 or more and specifically more preferably 0.99999 or more. The polarization degree p is determined according to the following equation.

$$p=1-\sin^2(2\theta 1) \cdot \sin^2(\pi Ro/\lambda)$$

wherein λ represents a wavelength of 590 nm at which measurement is carried out. θ1 (radian) was converted from θ0(°).

<Polarizing Plate>

The polarizing plates of the present invention will be described.

It is possible to prepare the polarizing plates employing common methods. It is preferable that the retardation film of the present invention is subjected to an alkali saponification treatment and the resulting retardation film is adhered, employing an aqueous completely-saponified polyvinyl alcohol solution, to at least one surface of a polarizing film which has been prepared by being immersed into an iodine solution and subsequently being stretched. The retardation film of the present invention may also be used for the reverse surface of the polarizing film or other polarizing plate protective film may be used for the reverse surface. Employed as a polarizing plate protective film on the reverse surface, instead of the retardation film of the present invention, may be commercially available retardation films. For example, preferably employed as commercially available retardation films are KC8UX2M, KC4UX, KC5UX, KC4UY, KC8UY, KC12UR, KC8UX-RHA (all produced by Konica Minolta Opt, Inc.). Alternatively, it is also preferable to use a polarizing plate protective film having a function of an optical compensating film by containing an optical anisotropic layer, which is prepared by orienting liquid crystal compounds such as a discotic liquid crystal, a rod-shaped liquid crystal, or a cholesteric liquid crystal. It is possible to form the optical anisotropic layer employing the method described in JP-A No. 2003-98348. By employing the combination of the antireflection film of the present invention, it is possible to obtain polarizing plates which exhibit excellent flatness and viewing angle increasing effects.

The polarizing film which is a major constituting component of polarizing plates, as described herein, refers to the element which only transmits the light of a polarized wave in the definite direction. One of the typical polarizing film, which is presently known, is a polyvinyl alcohol based polarizing film which is classified to one prepared by dying polyvinyl alcohol based film with iodine and the other prepared by dying the same with dichroic dyes. The polarizing film is prepared in such a manner that an aqueous polyvinyl alcohol solution is cast and the resulting cast film is subjected to uniaxial orientation and dying, or is subjected to dying and uniaxial orientation and subsequently to a durability treatment employing preferably boron compounds. One surface of the retardation film of the present invention is adhered to the surface of the above polarizing film, whereby a polarizing plate is formed. Adhesion is performed employing preferably water based adhesives containing completely-saponified polyvinyl alcohol as a major component.

A polarizing film is subjected to uniaxial orientation (commonly in the longitudinal direction). When a polarizing plate is allowed to stand at high temperature and high humidity, the length in the orientation direction (commonly in the longitudinal direction) decreases, while the length in the perpendicular direction (commonly the width direction) increases. As the thickness of a polarizing plate protective film decreases, shrinkage ratio increases, specifically, shrinkage ratio in the longitudinal direction increases. Generally, a polarizing film is adhered to a polarizing plate protective film so that the stretching direction of the polarizing film lies in the casting direction (also referred to as the MD direction (machine direction) or the film transportation direction) of the polarizing plate protective film. Consequently, it is important that when the thickness of the polarizing plate protective film is decreased, elongation and shrinkage ratio in the casting direction of the polarizing film is preferably decreased. The retardation film of the present invention is suitably applied to such a polarizing plate protective film due to its excellent dimensional stability.

Namely, in a durability test of the retardation film of the present invention under the condition of 60° C., 90% RH, wavy unevenness of the film does not appear. Also a polarizing plate having a retardation film of the present invention on the rear surface exhibits a wide viewing angle even after the durability test resulting in providing an excellent visibility.

It is also possible to constitute a polarizing plate by adhering a protective film on one surface of the polarizing plate and a separate film on the reverse surface. The protective film and the separate film are employed to protect the polarizing plate at its shipping and product inspection. In this case, the protective film is adhered to protect the surface of the polarizing plate on the surface reverse to the surface which is adhered to a liquid crystal cell. On the other hand, the separate film is employed to cover the adhesion layer to adhere to the liquid crystal cell and is provided on the surface to adhere the polarizing plate to a liquid cell.

By using the polarizing plate described above, provided is an LCD exhibiting high display properties and, specifically, an LCD having a direct illumination backlight unit provided behind its liquid crystal cell exhibiting reduced environmental variation of the quality and reduced leakage of light in the peripheral area of the display.

<Display>

By using the polarizing plate of the present invention, a variety of displays excellent in visibility are provided. The retardation film of the present invention is usable for the liquid crystal displays of various drive modes, such as STN, TN, OCB, HAN, VA (MVA, PVA), and IPS. Of these, preferable is an application of the polarizing plate of the present invention to an VA (MVA, PVA) mode LCD, by which an LCD of 30 inch size or more exhibiting reduced environmental variation of the quality and reduced leakage of light in the peripheral area of the display has been obtained. Specifically, an LCD employing a retardation film of the present invention exhibited reduced environmental variation of the quality and reduced leakage of light in the peripheral area of the display.

Moreover, although the backlight unit used for the liquid crystal display using the polarizing plate of the present invention may be a sidelight type, a direct illumination tyoe or a combination of both types, however, preferable is a direct illumination backlight unit provided just behind a liquid crystal cell.

A specifically preferable backlight unit include a LED direct illumination backlight unit for a color LCD provided behind a liquid crystal cell containing Red (R) LEDs, Green (G) LEDs and Blue (B) LEDs, of which peak wavelengths are, for example, 610 nm or more for Red (R), 530±10 nm for Green (G), and 480 nm or less for Blue (B). Examples of Green (G) LED having a peak wavelength in the above range include DG112H (made by Stanley Electric Co., Ltd.), UG1112H (made by Stanley Electric Co., Ltd.), E1L51-3G (made by TOYODA GOSEI CO., LTD.), E1L49-3G (made by TOYODA GOSEI CO., LTD.), NSPG500S (made by Nichia Corp.). Examples of Red (D) LED include FR1112H (made by Stanley Electric Co., Ltd.), FR5366X (made by Stanley Electric Co., Ltd.), NSTM515AS (made by Nichia Corp.), GL3ZR2D1COS (product made from Sharp) and GM1JJ35200AE (product made from Sharp). Examples of Blue (B) LED include DB1112H (made by Stanley Electric Co., Ltd.), DB5306X (made by Stanley Electric Co., Ltd.), E1L51-3B (made by TOYODA GOSEI CO., LTD.), E1L4E-SB1A (made by TOYODA GOSEI CO., LTD.), NSPB630S (made by Nichia Corp.) and NSPB310A (made by Nichia Corp.). LEDs of the above three colors may be combined to make a backlight or a white LED may be used.

Also, direct illumination backlight units are disclosed, for example, in JP-A No. 2001-281656, JP-A No. 2001-305535 (point-like LEDs are used) and JP-A No. 2002-311412, however, the present invention is not limited thereto.

EXAMPLES

The present invention will be further described based on examples, however, the present invention is not limited thereto.

Example 1

<Preparation of Dope>

The following material were loaded in turn and sealed in a container and the temperature was raised from 20° C. to 80° C. The loaded materials were stirred in the container at 80° C. for three hours, whereby the cellulose ester was completely dissolved. Then, stirring was stopped and the temperature was lowered to 43° C. Obtained solution was filtered using Filter Paper No. 244 produced by Azumi Filter Paper Co., Ltd to obtain a dope.

| | |
|---|---|
| Methylene chloride | 300 weight parts |
| Ethanol | 40 weight parts |
| Cellulose ester (cellulose acetate propionate; acetyl substitution degree of 1.9, propionyl substitution degree of 0.7 and Mw/Mn of 2.0) | 100 weight parts |
| Compound 1 (polyalcohol ester, hydroxyl value of 5 mgKOH/g) | 5 weight parts |
| Acetyl tri-n-butyl citrate (polycarboxylic acid ester, acid value of 0.1 mgKOH/g) | 5 weight parts |
| TINUVIN 109 (produced by Ciba Specialty Chemicals Inc.,) | 1.2 weight parts |
| TINUVIN 171 (produced by Ciba Specialty Chemicals Inc.,) | 0.5 weight parts |
| Silica Particles (Aerosil R972V produced by Nippon Aerosil Co., Ltd.) | 0.1 weight parts |

The dope prepared as above was cast through a casting die kept at 30° C. on a stainless steel endless support kept at 30° C. After the formed web was dried until the amount of residual solvent decreased to 80% by weight, the web was peeled from the support using a peeling roller.

Subsequently, the web was dried in an 70° C. air flow by passing through many rollers placed alternatively up and down in a staggered manner (the transport-drying process), then the both edges of the web were clipped with a tenter and stretched by 1.3 times in the lateral direction at 130° C. so that a desired retardation value was obtained (the desired retardation value was obtained by controlling the stretching magnification and temperature).

The stretched web was further dried in an 105° C. air flow by passing through many rollers placed alternatively up and down in a staggered manner to obtain a film containing residual solvent of 0.3% by weight. In this manner a long sheet Retardation Film 101 was obtained. The properties of Retardation Film 101 were as follows:

A long sheet retardation film of the length of 2600 m and the thickness of 80 μm, both edges of the width of 15 mm were subjected to a knurling treatment of the average depth of 10 μm, exhibiting the in-plane retardation value of Ro=50 (nm); the retardation value in the thickness direction of Rt=140 (nm); the Rt/Ro value of 2.8, the Ro and Rt values being measured at a wavelength of 590 nm at 23° C. under 55% RH.

Retardation Films 102-139 each exhibiting Ro=50 (nm), Rt=140 (nm), and Rt/Ro=2.8 were prepared in the same manner as Retardation Film 101 except that the compounds, amounts, acid values, hydroxyl values, substitution degrees of cellulose ester and Mw/Mn values of the plasticizers (polyalcohol esters and polycarboxylic acid esters) were changed as shown in Table 1.

In Table 1, Compound 1 represents trimethylolpropane tribenzoate, Compound 2 represents pentaerythritol tetrabenzoate, Compound 3 represents glycerin tribenzoate, and ATBC represents acetyl tributyl citrate.

<<Evaluation>>

ΔRt, dimensional variations, and haze were measured for the obtained Retardation Films 101-139.

<Ro, Rt, ΔRt>

According to the above mentioned method, Ro and Rt of each sample were determined using an automatic birefringence analyzer KOBRA21-ADH (Oji Scientific Instruments). Each sample was left in one of the following conditions for 24 hours to control humidity and Ro and Rt of each sample were measured in the same condition in which the sample was left, namely, the conditions: at 23° C. under 20% RH, at 23° C. under 55% RH and at 23° C. under 80% RH. Unless otherwise specifically stated, Ro and Rt were measured at 23° C. under 55% RH. Ro and Rt were measured at a wavelength of 590 nm.

The difference of Rt measured at 23° C. under 20% RH and Rt measured at 23° C. under 80% RH was defined as ΔRt.

$$\Delta Rt = (Rt \text{ measured at } 23° \text{ C. under } 20\% \text{ RH}) - (Rt \text{ measured at } 23° \text{ C. under } 80\% \text{ RH})$$

The ΔRt value is preferably smaller, however, the value of not more than 26 nm is allowable and it is preferably not more than 22 nm, more preferably not more than 15 nm and further preferably not more than 10 nm.

<Measurement of Dimensional Variation>

(Dimensional Variation (60° C., 90% RH, 1000 h)

Each specimen was cut out in 120 mm×120 mm size, and two cross-marks were drawn with a distance of 100 mm in the cast direction on the film surface with a sharp cutter such as a razor. The specimen was kept at 23° C. under 55% RH for 24 hours to control the humidity and the surface was observed by a microscope to measure the distance between the cross-marks L1 before the following high temperature treatment. The specimen was then subjected to a high temperature treatment, namely, the specimen was kept in a constant temperature oven for 1000 hours at 60° C. under 90% RH. After the treatment, the specimen was further kept at 23° C. under 55% RH for 24 hours, followed by observing the surface with a microscope to measure the distance between the cross-marks L2 after the high temperature treatment. The rate of dimensional variation before and after the high temperature treatment was defined by the following equation.

$$\text{Rate of dimensional variation (60° C., 90\% RH, 1000 h)} = (L2-L1)/L1 \times 100(\%)$$

When the rate of dimensional variation (60° C., 90% RH, 1000 h) is in the range of 0-0.5%, the film is suitable for practical use, however, the rate of dimensional variation is preferably in the range of 0-0.3%, and more preferably, 0-0.15%.

(Dimensional Variation (90° C., Dry, 1000 h))

The dimensional variation (90° C., Dry, 1000 h) was determined in the same manner as above except that the high temperature treatment was carried out at 90° C., dry for 1000 hours, wherein the condition of (90° C. Dry, 1000 h) means that the treatment was carried out without controlling humidity at 90° C. for 1000 hours.

When the rate of dimensional variation (90° C., Dry, 1000 h) is in the range of 0-0.4%, the film is suitable for practical use, however, the rate of dimensional variation is preferably in the range of 0-0.2%.

(Dimensional Variation (80° C., 90% RH, 50 h→50° C., 2 h)

Each specimen was cut out in 60 mm×60 mm size, and two cross-marks were drawn with a distance of 40 mm in the cast direction on the film surface with a sharp cutter such as a razor. The specimen was kept at 23° C. under 55% RH for 24 hours to control the humidity and the surface was observed by a microscope to measure the distance between the cross-marks L3 before the following high temperature treatment. The specimen was then subjected to a high temperature treatment, namely, the specimen was kept in a constant temperature oven for 50 hours at 80° C. under 90% RH. After that, the specimen was taken out from the constant temperature oven and placed on a 50° C. hot plate within 1 minute after taking out of the constant temperature oven and kept for 2 hours, followed by observing the surface with a microscope to measure the distance between the cross-marks L4 after the high temperature treatment, while the specimen was heated on the hot plate. The rate of dimensional variation before and after the high temperature treatment was defined by the following equation.

$$\text{Rate of dimensional variation (80° C., 90\% RH, 50 h} \rightarrow 50° \text{ C., 2 h)} = (L4-L3)/L3 \times 100(\%)$$

When the rate of dimensional variation (80° C., 90% RH, 50 h→50° C., 2 h) is in the range of 0-1.5%, the film is suitable for practical use, however, the rate of dimensional variation is preferably in the range of 0-1.0%, and more preferably in the range of 0-0.6%.

<Measurement of Haze>

According to the method defined in JIS K 7136 (identical with ISO 14782:99), the haze was measured using the turbidimeter (NDH2000, Nippon Denshoku Industries Co., Ltd.). The measurement was carried out using three piled films. When the measured haze is not more than 3.0%, the film is suitable for practical use, however, the haze is preferably not more than 2.0% and more preferably not more than 1.0%.

The details of the above mentioned retardation films and the results of evaluation thereof are shown in Table 1.

TABLE 1

| Retardation film No. | Polyalcohol ester | | | Polycarboxylic acid ester | | | Cellulose ester | | |
|---|---|---|---|---|---|---|---|---|---|
| | Compound | Hydroxyl value | Amount | Compound | Acid value | Amount | Acetyl | Propionyl | Mw/Mn |
| 101 | Compound 1 | 5 | 5 | ATBC | 0.1 | 5 | 1.9 | 0.7 | 2.0 |
| 102 | Compound 1 | 5 | 11 | ATBC | 0.1 | 11 | 1.9 | 0.7 | 2.0 |
| 103 | Compound 1 | 5 | 10 | ATBC | 0.1 | 10 | 1.9 | 0.7 | 2.0 |
| 104 | Compound 1 | 5 | 7.5 | ATBC | 0.1 | 7.5 | 1.9 | 0.7 | 2.0 |
| 105 | Compound 1 | 5 | 5 | ATBC | 0.1 | 5 | 1.9 | 0.7 | 2.0 |
| 106 | Compound 1 | 5 | 2.5 | ATBC | 0.1 | 2.5 | 1.9 | 0.7 | 2.0 |
| 107 | Compound 1 | 5 | 1.5 | ATBC | 0.1 | 1.5 | 1.9 | 0.7 | 2.0 |
| 108 | Compound 1 | 5 | 3 | ATBC | 0.1 | 7 | 1.9 | 0.7 | 2.0 |

TABLE 1-continued

| No. | Compound | | | Plasticizer | | | | | |
|---|---|---|---|---|---|---|---|---|---|
| 109 | Compound 1 | 5 | 4 | ATBC | 0.1 | 6 | 1.9 | 0.7 | 2.0 |
| 110 | Compound 1 | 5 | 7 | ATBC | 0.1 | 3 | 1.9 | 0.7 | 2.0 |
| 111 | Compound 1 | 5 | 8 | ATBC | 0.1 | 2 | 1.9 | 0.7 | 2.0 |
| 112 | Compound 1 | 5 | 5 | ATBC | 0.1 | 3 | 1.9 | 0.7 | 2.0 |
| 113 | Compound 1 | 5 | 5 | ATBC | 0.1 | 2.5 | 1.9 | 0.7 | 2.0 |
| 114 | Compound 1 | 11 | 5 | ATBC | 0.1 | 3 | 1.9 | 0.7 | 2.0 |
| 115 | Compound 1 | 10 | 5 | ATBC | 0.1 | 3 | 1.9 | 0.7 | 2.0 |
| 116 | Compound 1 | 6 | 5 | ATBC | 0.1 | 3 | 1.9 | 0.7 | 2.0 |
| 117 | Compound 1 | 5 | 5 | ATBC | 1.1 | 3 | 1.9 | 0.7 | 2.0 |
| 118 | Compound 1 | 5 | 5 | ATBC | 1.0 | 3 | 1.9 | 0.7 | 2.0 |
| 119 | Compound 1 | 5 | 5 | ATBC | 0.2 | 3 | 1.9 | 0.7 | 2.0 |
| 120 | Compound 1 | 5 | 5 | ATBC | 0.1 | 3 | 1.7 | 0.7 | 2.0 |
| 121 | Compound 1 | 5 | 5 | ATBC | 0.1 | 3 | 1.8 | 0.7 | 2.0 |
| 122 | Compound 1 | 5 | 5 | ATBC | 0.1 | 3 | 2.1 | 0.7 | 2.0 |
| 123 | Compound 1 | 5 | 5 | ATBC | 0.1 | 3 | 1.9 | 0.7 | 1.4 |
| 124 | Compound 1 | 5 | 5 | ATBC | 0.1 | 3 | 1.9 | 0.7 | 2.2 |
| 125 | Compound 1 | 5 | 5 | ATBC | 0.1 | 3 | 1.9 | 0.7 | 3.0 |
| 126 | Compound 2 | 5 | 5 | ATBC | 0.1 | 5 | 1.9 | 0.7 | 2.0 |
| 127 | Compound 3 | 5 | 5 | ATBC | 0.1 | 5 | 1.9 | 0.7 | 2.0 |
| 128 | Compound 1 | 5 | 5 | ATBC | 0.1 | 5 | 1.9 | 0.7 | 2.0 |
| 129 | Compound 1 | 5 | 5 | ATBC | 0.1 | 5 | 1.9 | 0.7 | 2.0 |
| 130 | Compound 1 | 5 | 5 | ATBC | 0.1 | 5 | 1.8 | 0.7 | 2.0 |
| 131 | Compound 1 | 5 | 5 | ATBC | 0.1 | 5 | 1.8 | 0.7 | 2.0 |
| 132 | Compound 1 | 5 | 5 | ATBC | 0.1 | 3 | 1.6 | 0.7 | 2.0 |
| 133 | Compound 1 | 5 | 5 | ATBC | 0.1 | 3 | 2.2 | 0.7 | 2.0 |
| 134 | Compound 1 | 5 | 5 | ATBC | 0.1 | 3 | 1.9 | 0.7 | 1.3 |
| 135 | Compound 1 | 5 | 5 | ATBC | 0.1 | 3 | 1.9 | 0.7 | 3.1 |
| 136 | Compound 1 | 5 | 10 | — | — | — | 1.9 | 0.7 | 2.0 |
| 137 | Compound 1 | 5 | 5 | — | — | — | 1.9 | 0.7 | 2.0 |
| 138 | — | — | — | ATBC | 0.1 | 10 | 1.9 | 0.7 | 2.0 |
| 139 | — | — | — | ATBC | 0.1 | 5 | 1.9 | 0.7 | 2.0 |

| Retardation film No. | Film Thickness (μm) | Retardation value Ro | Rt | ΔRt 20% RH →80% RH | 60° C. 90% RH1000 h | 90° C. Dry 1000 h | 80° C. 90% RH2d →50° C. 2 h | Haze (%) | Remarks |
|---|---|---|---|---|---|---|---|---|---|
| 101 | 80 | 50 | 140 | 18 | 0.10 | 0.13 | 0.79 | 0.8 | Inv. |
| 102 | 80 | 50 | 140 | 7 | 0.29 | 0.30 | 0.92 | 0.9 | Inv. |
| 103 | 80 | 50 | 140 | 8 | 0.24 | 0.19 | 0.88 | 0.8 | Inv. |
| 104 | 80 | 50 | 140 | 13 | 0.16 | 0.15 | 0.85 | 0.8 | Inv. |
| 105 | 80 | 50 | 140 | 18 | 0.10 | 0.13 | 0.79 | 0.8 | Inv. |
| 106 | 80 | 50 | 140 | 20 | 0.10 | 0.12 | 0.82 | 0.9 | Inv. |
| 107 | 80 | 50 | 140 | 22 | 0.08 | 0.10 | 0.88 | 1.2 | Inv. |
| 108 | 80 | 50 | 140 | 19 | 0.18 | 0.21 | 0.82 | 0.8 | Inv. |
| 109 | 80 | 50 | 140 | 18 | 0.12 | 0.14 | 0.79 | 0.8 | Inv. |
| 110 | 80 | 50 | 140 | 17 | 0.14 | 0.12 | 0.76 | 0.8 | Inv. |
| 111 | 80 | 50 | 140 | 17 | 0.18 | 0.15 | 0.81 | 1.3 | Inv. |
| 112 | 80 | 50 | 140 | 20 | 0.08 | 0.09 | 0.80 | 0.9 | Inv. |
| 113 | 80 | 50 | 140 | 25 | 0.07 | 0.07 | 0.82 | 1.2 | Inv. |
| 114 | 80 | 50 | 140 | 25 | 0.45 | 0.20 | 1.24 | 0.8 | Inv. |
| 115 | 80 | 50 | 140 | 21 | 0.25 | 0.18 | 0.94 | 0.8 | Inv. |
| 116 | 80 | 50 | 140 | 20 | 0.14 | 0.17 | 0.82 | 0.8 | Inv. |
| 117 | 80 | 50 | 140 | 25 | 0.48 | 0.19 | 1.26 | 0.8 | Inv. |
| 118 | 80 | 50 | 140 | 22 | 0.26 | 0.17 | 0.95 | 0.8 | Inv. |
| 119 | 80 | 50 | 140 | 20 | 0.14 | 0.15 | 0.83 | 0.8 | Inv. |
| 120 | 80 | 50 | 140 | 20 | 0.27 | 0.25 | 0.98 | 1.9 | Inv. |
| 121 | 80 | 50 | 140 | 18 | 0.10 | 0.13 | 0.78 | 0.8 | Inv. |
| 122 | 80 | 50 | 140 | 18 | 0.26 | 0.25 | 0.92 | 1.4 | Inv. |
| 123 | 80 | 50 | 140 | 19 | 0.14 | 0.17 | 0.97 | 1.0 | Inv. |
| 124 | 80 | 50 | 140 | 18 | 0.12 | 0.13 | 0.81 | 0.8 | Inv. |
| 125 | 80 | 50 | 140 | 20 | 0.28 | 0.20 | 0.95 | 0.9 | Inv. |
| 126 | 80 | 50 | 140 | 18 | 0.10 | 0.13 | 0.82 | 0.8 | Inv. |
| 127 | 80 | 50 | 140 | 18 | 0.26 | 0.13 | 0.94 | 0.8 | Inv. |
| 128 | 70 | 50 | 140 | 14 | 0.17 | 0.13 | 0.82 | 0.8 | Inv. |
| 129 | 40 | 50 | 140 | 9 | 0.33 | 0.13 | 1.13 | 0.8 | Inv. |
| 130 | 70 | 50 | 140 | 14 | 0.12 | 0.13 | 0.80 | 0.8 | Inv. |
| 131 | 40 | 50 | 140 | 9 | 0.26 | 0.13 | 0.96 | 0.8 | Inv. |
| 132 | 80 | 50 | 140 | 27 | 0.52 | 0.38 | 1.66 | 5.3 | Comp. |
| 133 | 80 | 50 | 140 | 18 | 0.58 | 0.45 | 1.52 | 4.1 | Comp. |
| 134 | 80 | 50 | 140 | 20 | 0.28 | 0.19 | 1.53 | 1.8 | Comp. |
| 135 | 80 | 50 | 140 | 21 | 0.51 | 0.42 | 1.51 | 1.1 | Comp. |
| 136 | 80 | 50 | 140 | 18 | 0.18 | 0.19 | 1.62 | 5.6 | Comp. |
| 137 | 80 | 50 | 140 | 30 | 0.05 | 0.15 | 2.58 | 5.3 | Comp. |

TABLE 1-continued

| 138 | 80 | 50 | 140 | 20 | 0.24 | 0.20 | 1.55 | 0.8 | Comp. |
| 139 | 80 | 50 | 140 | 35 | 0.10 | 0.18 | 2.92 | 1.0 | Comp. |

Inv.: Inventive Sample,
Comp.: Comparative Sample

From Table 1, the variations in retardation values of the retardation films of the present invention were found to be smaller even when humidity was changed, compared to those observed for the comparative samples. Although, the dimensional stability of the retardation films of the present invention under the above conditions of 60° C., 90% RH, 1000 h and 90° C., Dry, 1000 h were similar or slightly higher compared to those of comparative samples, notable improvement was observed for the dimensional stability of the retardation films of the present invention under a severer condition of above 80° C., 90% RH, 50 h→50° C., 2 h, compared to that of comparative samples. Since the temperature of an LCD having backlight units, specifically LED direct illumination backlight units increases as high as 50° C., the test of dimensional stability under the severer condition was carried out. Even if conventional retardation films exhibit favorable dimensional stability under conventional test conditions of rate of dimensional variation, the dimensional stability of those retardation films were found to notably degrade under the severer condition described above, while the retardation films of the present invention were found to maintain higher dimensional stability even under the severer condition.

A polarizing plate was prepared using the obtained retardation film as a polarizing plate protective film and Polarizing Plate Protective Film C provided on the other surface of the polarizing plate. The production method of Polarizing Plate Protective Film C was as follows:

<Polarizing Plate Protective Film C>
(Silica Dispersed Diluting Solution C)

| | |
|---|---|
| Aerosil 972V (produced by NIPPON AEROSIL Co., Ltd.) (Mean primary particles diameter of 16 nm, apparent specific gravity of 90 g/l) | 12 weight parts |
| Ethanol | 88 weight parts |

The above materials were mixed and stirred for 30 minutes using a dissolver, followed by dispersing with Manton-Gaulin homogenizer. The resulting solution was mixed with 88 weight parts of methylene chloride while stirring and further dispersed for 30 minutes using a dissolver to obtain Silica Dispersed Diluting Solution C.

(Preparation of In-Line Additive Solution C)

| | |
|---|---|
| TINUVIN 109 (produced by Ciba Specialty Chemicals Inc.) | 11 weight parts |
| TINUVIN 171 (produced by Ciba Specialty Chemicals Inc.) | 5 weight parts |
| Methylene chloride | 100 weight parts |

The above materials were loaded in a sealed reaction vessel and well dissolved by heating and stirring, followed by filtering.

In the resulting solution, 36 weight parts of Silica Dispersed Diluting Solution C was added while the solution was being stirred and stirred for 30 minutes. Further, 6 weight parts of cellulose acetate propionate (acetyl substitution degree of 1.9, propionyl substitution degree of 0.8) was added while stirring and further stirred for 60 minutes. The resulting solution was filtered with polypropylen wound cartridge filter TCW-PPS-1N produced by Advantec Toyo, Ltd. to prepare In-Line Additive Solution C.

(Preparation of Dope C)

| | |
|---|---|
| Methylene chloride | 440 weight parts |
| Ethanol | 40 weight parts |
| Cellulose ester (cellulose triacetate prepared from cotton linter, Mn = 148000, Mw = 310000, Mw/Mn = 2.1, acetyl substitution degree: 2.92) | 100 weight parts |
| Trimethylolpropane tribenzoate | 5 weight parts |
| Ethylphthalylethyl glycolate | 5 weight parts |

The above materials were loaded in a sealed reaction vessel and well dissolved by heating and stirring, and filtered using Filter paper No. 24 produced by Azumi Filter Paper Co., Ltd. to obtain Dope C. Dope C was further filtered in a film forming line using Finemet NF produced by Nippon Seisen Co., Ltd. Also, In-Line Additive Solution C was filtered in an in-line additive solution line using Finemet NF produced by Nippon Seisen Co., Ltd. 100 weight parts of filtered Dope C was mixed with 2 weight parts of filtered In-Line Additive Solution C and throughly mixed using a in-line mixer (Hi-Mixer SWJ produced by Toray Engineering Co., Ltd.), and uniformly cast on a stainless steel belt support of a width of 1800 mm at 35° C. using a belt casting apparatus. The cast film was dried until the residual solvent decreased to 120% on the belt support and peeled from the belt support. The peeled cellulose ester web was further dried at 35° C. and slit into a width of 1650 mm, then, further dried at 135° C. while the web was stretched by 1.1 times using a tenter. The amount of the residual solvent when the tenter stretching was started was 30%.

The drying process was finalized by passing the web through many rolls at 110° C. and 120° C. The web was then slit into a width of 1.4 m and both the edges of widths of 15 mm were subjected to a 10 μm depth of knurling treatment. The web was wound to a core of 6 in. in diameter with initial tension of 220 N/m and final tension of 110 N/m. Thus Polarizing Plate Protective Film C was obtained. The stretching magnification in the film transporting direction of the web just after the web was peeled from the belt support was 1.07, which was estimated from the velocity of the stainless steel belt support and the driving velocity of the tenter. The amount of residual solvent of obtained Polarizing Plate Protective Film C was 0.3%, the average thickness was 80 μm and the length was 2600 m.

<<Production of Polarizing Plate>>

A polyvinyl alcohol film having thickness of 120 μm was uniaxially stretched at 110° C. with a stretching magnification of 5, which was then immersed in an aqueous solution of 0.075 g of iodine, 5 g of potassium iodide and 100 g of water for 60 seconds. The resulting film was further immersed into an aqueous solution of 6 g of potassium iodide, 7.5 g of boric acid and 100 g of water at 68° C., followed by washing with water and drying to obtain a polarizing film.

Polarizing Plates 101-139 were produced by continuously adhering a long sheet polarizing film on one surface and the above mentioned Polarizing Plate Protective Film C on the other surface of each of the above mentioned Retardation Films 101 to 139, according to the following Processes 1-5.

Process 1:

Saponifying one surface of the retardation film of the present invention and one surface of Polarizing Plate Protective Film C, the surfaces being to be adhered each other, by immersing each film in a 2 moles/l of sodium hydroxide aqueous solution at 60° C. for 90 seconds, followed by washing in water and drying.

Process 2:

Applying an adhering agent containing polyvinyl alcohol, solid content of which is 2% by weight, onto both surfaces of the above mentioned polarizing film and inserting the polarizing film between the retardation film of the present invention and Polarizing Plate Protecting Film C both of which were saponified in Process 1, followed by laminating the films.

Process 3:

Pressing the laminated films in Process 2 to adhere them with a pressure of 20-30 N/cm$^2$ and a transportation velocity of 2 m/minute.

Process 4:

The adhered films were dried in a 80° C. drying oven for 5 minutes to obtain a polarizing plate.

<<Production of Liquid Crystal Display>>

The following liquid crystal panels were produced using the produced polarizing plates, the properties of which were evaluated as a liquid crystal display.

Polarizing plates provided on both surfaces of the liquid crystal cell of 15 inch size display VL150 produced by FUJITSU were removed and each of the above mentioned Polarizing Plates 101-139 was adhered on the glass plate of the liquid crystal cell (VA type) to obtain Liquid Crystal Displays 101-139.

In the preparation of Polarizing Plates 101-139, the polarizing plate of the present invention was laminated so that the absorbtion axis of the polarizing plate of the present invention lay in the same direction as that of the removed polarizing plate.

Each liquid crystal display was kept under a condition of 60° C., 90% RH for 90 hours, then, backlight units were lighted on. After 5 hours, a viewing angle measurement and a front contrast measurement were carried out using EZ-contrast produced by ELDIM. When a polarizing plate of a comparative sample was used in the display, the viewing angle was narrower and the frontal contrast drastically degraded, while, when a polarizing plate of the present invention was used, a wider viewing angle was observed and the degradation of front contrast was only limited.

Example 2

Retardation Film 102 was prepared in the same manner as Retardation Film 101 except that the heat treatment described below was carried out.

After stretching the web using a tenter, the web was dried by passing through many rolls arrayed alternately up and down until the amount of residual solvent decreased to 0.3% and then heat treated at 100° C. for 20 minutes in an atmosphere where the rate of atmosphere replacement is 10 times/h, followed by cooling down to ambient temperature and wounding in a roll. Thus obtained was Retardation Film 201 having Ro=50 nm, Rt=130 nm, Rt/Ro=2.6, a thickness of 80 μm, a length of 2600 m and both the edges of widths of 15 mm being subjected to a 10 μm depth of knurling treatment.

Retardation Films 202-210 were produced in the same manner as Retardation Film 201 except that the free volume radii and the free volume parameters were changed as shown in Table 2 by changing heat treatment temperature, rate of atmosphere replacement, press treatment in the thickness direction of the web conducted while the web was passing through many rolls arrayed alternately up and down.

The rate of atmosphere replacement is the number of times the atmosphere is replaced by Fresh-air per unit time, which is expressed by the following equation.

Rate of atmosphere replacement=$FA/V$(time/hour)

where V (m$^3$) represents volume of a heat treatment chamber and FA represents the amount of blasted fresh-air (m$^3$/h) in the heat treatment chamber.

ΔRt and dimensional variation were measured for obtained Retardation Films 201-210 in the same manner as in Example 1.

From the results shown in Table 2, it was found that the retardation films of the present invention, in which the free volume radii and the free volume parameters were controlled in prescribed ranges, exhibited reduced variation of retardation values due to a humidity change and further reduced dimensional variations after the high temperature-high humidity treatment.

Polarizing Plates 201-209 were produced by the same manner as described in example 1 using the obtained Retardation Films 201-209.

(Production of Liquid Crystal Display (LCD))

Forty sets of polarizing plates were prepared for each of Polarizing Plates 201-209 and Polarizing Plates 132-139 (comparative samples) produced in Example 1. Using these polarizing plates, forty LCDs (VA mode, 37 inch size) each having a LED direct illumination backlight unit were fabricated for each set of the above polarizing plates, where one LCD was prepared by adhering two polarizing plates on the glass plates on both surfaces of the liquid crystal cell. After a durability measurement for 1000 hours under a condition of 60° C., 90% RH, a backlight of each LCD was lighted on, and after 5 hours, number of LCDs exhibiting leakage of light in the peripheral area of the display was counted. The results showed that the LCD using one of Polarizing Plates 201-209 was ranked as one of the following criteria A-C, which meant that these LCDs were notably improved, while the LCD using one of Polarizing Plates 132-139 (comparative samples) was ranked as the following criterion E.

A: Light leakage was not observed.
B: Slight light leakage was observed in 1-2 LCDs.
C: Slight light leakage was observed in 3-5 LCDs.
D: Slight light leakage was observed in 6-9 LCDs.
E: strong light leakage was observed in 10 or more LCDs.

LCDs ranked as one of the criteria A-C was evaluated as suitable for practical use.

The results were shown in Table 2.

TABLE 2

| | Treatment temperature (° C.) | Atmosphere change rate (times/h) | Treatment pressure | Free volume radius (nm) | Total free volume parameter | ΔRt 20% RH → 80% RH | Rate of dimensional variation 80° C. 90% RH2d → 50° C. 2 h | Light leakage occurrence | Remarks |
|---|---|---|---|---|---|---|---|---|---|
| 201 | 100° C. | 10 | — | 0.312 | 2.1 | 18 | 0.79 | C | Inv. |
| 202 | 110° C. | 10 | — | 0.310 | 2.0 | 17 | 0.62 | B | Inv. |
| 203 | 110° C. | 15 | — | 0.305 | 1.9 | 15 | 0.58 | B | Inv. |
| 204 | 110° C. | 10 | 1 kPa | 0.304 | 1.8 | 14 | 0.55 | B | Inv. |
| 205 | 120° C. | 10 | — | 0.300 | 1.8 | 14 | 0.51 | B | Inv. |
| 206 | 125° C. | 15 | 1 kPa | 0.280 | 1.4 | 13 | 0.43 | A | Inv. |
| 207 | 125° C. | 25 | 3 kPa | 0.271 | 1.2 | 13 | 0.38 | A | Inv. |
| 208 | 130° C. | 10 | — | 0.274 | 1.2 | 13 | 0.39 | A | Inv. |
| 209 | 135° C. | 25 | 10 kPa | 0.250 | 1.0 | 13 | 0.38 | A | Inv. |
| 210 | 145° C. | 30 | 15 kPa | 0.240 | 0.9 | 16 | 0.61 | C | Inv. |

Inv.: Inventive Sample

From the above results, it was found that, even when the LCD was of a large size, light leakage was notably reduced in the LCD using the retardation film of the present invention, in which the plasticizer of the present invention was contained, the free volume radius and the free volume parameter were controlled in the ranges prescribed in the present invention by controlling the temperature of heat treatment after drying, the rate of atmosphere replacement and the pressure in the press treatment.

What is claimed is:

1. A retardation film comprising:
a polyalcohol ester, a polycarboxylic acid ester, and a cellulose ester, the polyalcohol ester being an ester of a monocarboxylic acid and a polyalcohol,
wherein
a total acylation degree of the cellulose ester is in the range of 2.4-2.8;
a Mw/Mn value of the cellulose ester is in the range of 1.4-3.0, provided that Mw represents a weight average molecular weight and Mn represent a number average molecular weight of the cellulose ester; and
an Ro and an Rt of the retardation film are defined by the following formulas and satisfy the following conditions:
Ro is in the range of 30-300 nm,
Rt is in the range of 100-400 nm, and
Rt/Ro is in the range of 1.5-6.0,
wherein $Ro=(nx-ny) \times d$ and $Rt=((nx+ny)/2-nz) \times d$, wherein Ro represents an in-plane retardation value, Rt represents an out-of-plane retardation value in a thickness direction; nx represents an in-plane refractive index in a slow axis direction, ny represents an in-plane refractive index in a fast axis direction, nz represents an out-of-plane refractive index in the thickness direction, and d represents a thickness of the retardation film in nanometers.

2. The retardation film of claim 1,
wherein
the monocarboxylic acid contains an aromatic ring or a cycloalkyl ring in the molecule; and
a hydroxyl value of the polyalcohol ester is not more than 10 mgKOH/g.

3. The retardation film of claim 1,
wherein
the polycarboxylic acid ester is an polyoxycarboxylic acid ester; and
an acid value of the polyalcohol acid ester is not more than 1 mgKOH/g.

4. The retardation film of claim 1,
wherein
a free volume radius determined by positron annihilation lifetime spectroscopy is in the range of 0.250-0.310 nm.

5. The retardation film of claim 1,
where
a free volume parameter determined by positron annihilation lifetime spectroscopy is in the range of 1.0-2.0.

6. The retardation film of claim 1,
wherein
Ro and Rt satisfy the following conditions:
Ro is in the range of 50-300 nm;
Rt is in the range of 130-400 nm; and
Rt/Ro is in the range of 1.5-6.0.

7. The retardation film of claim 1,
wherein the thickness of the retardation film is in the range of 40,000-70,000 nm.

8. A polarizing plate comprising the retardation film of claim 1 and a polarizing film.

9. A display comprising the retardation film of claim 1 provided on one surface of a liquid crystal cell and a direct illumination backlight unit.

10. The retardation film of claim 1, wherein a total amount of the polyalcohol ester and the polycarboxylic acid ester incorporated in the retardation film is 3 to 20% by weight.

11. The retardation film of claim 1, wherein a ratio of (the polyalcohol ester):(the polycarboxylic acid ester) by weight is 4:6-8:2.

* * * * *